12) United States Patent
Adams et al.

(10) Patent No.: US 9,890,677 B2
(45) Date of Patent: Feb. 13, 2018

(54) SYSTEM AND METHOD FOR THE MONITORING AND CONTROLLING OF EMISSIONS FOR MULTIPLE ENGINES

(71) Applicant: Cummins, Inc., Columbus, IN (US)

(72) Inventors: Christopher D. Adams, Seymour, IN (US); Brian K. Rout, Columbus, IN (US); Duane A. Kruer, Floyds Knobs, IN (US)

(73) Assignee: Cummins, Inc., Columbus, IN (US)

(*) Notice: Subject to any disclaimer, the term of this patent is extended or adjusted under 35 U.S.C. 154(b) by 260 days.

(21) Appl. No.: 14/570,533

(22) Filed: Dec. 15, 2014

(65) Prior Publication Data
US 2015/0168260 A1 Jun. 18, 2015

Related U.S. Application Data

(60) Provisional application No. 61/916,586, filed on Dec. 16, 2013.

(51) Int. Cl.
F01N 3/20 (2006.01)
G05B 23/02 (2006.01)
(Continued)

(52) U.S. Cl.
CPC .......... F01N 3/2006 (2013.01); F01N 3/106 (2013.01); F01N 3/208 (2013.01); F01N 3/2033 (2013.01);
(Continued)

(58) Field of Classification Search
CPC ......... Y02T 10/47; Y02T 10/24; Y02T 10/26; Y02T 10/22; Y02T 10/18; Y02T 10/40; Y02T 10/42; F01N 3/2066; F01N 3/208; F01N 2610/02; F01N 3/035; F01N 11/00; F01N 2560/06; F01N 11/002; F01N 2560/026; F01N 2550/02;
(Continued)

(56) References Cited

U.S. PATENT DOCUMENTS 6,975,975 B2  12/2005  Fasca
7,813,869 B2  10/2010  Grichnik et al.
(Continued)

OTHER PUBLICATIONS

Minggang Zheng, Hui Gao, Ziaohui Zhu; Research on Developing DPF Blowback Heating Regeneration Device, 2010, Elsevier Ltd, pp. 661-666.*

(Continued)

Primary Examiner — Peter Macchiarolo
Assistant Examiner — Timothy Graves
(74) Attorney, Agent, or Firm — Foley & Lardner LLP

(57) ABSTRACT

An apparatus for controlling a total emissions amount from a facility includes an emissions module structured to interpret data indicative of an emissions amount from a test cell system in the facility; an emissions threshold module structured to aggregate the emissions amount from each test cell system in the facility to determine a total emissions amount for the facility and compare the total emissions amount to a predetermined threshold for the facility; and an aftertreatment system control module structured to selectively control a component in an aftertreatment system associated with each test cell system responsive to the comparison of the total emissions amount to the predetermined threshold.

19 Claims, 18 Drawing Sheets

(51) Int. Cl.
*F01N 3/10* (2006.01)
*F01N 11/00* (2006.01)
*F01N 13/00* (2010.01)

(52) U.S. Cl.
CPC .......... *F01N 11/002* (2013.01); *F01N 13/009* (2014.06); *G05B 23/0283* (2013.01); *G05B 23/0286* (2013.01); *G05B 23/0294* (2013.01); *F01N 2560/026* (2013.01); *F01N 2560/06* (2013.01); *F01N 2560/07* (2013.01); *F01N 2900/1402* (2013.01); *F01N 2900/1404* (2013.01); *F01N 2900/1406* (2013.01); *F01N 2900/1411* (2013.01); *F01N 2900/1812* (2013.01); *Y02T 10/24* (2013.01); *Y02T 10/26* (2013.01); *Y02T 10/47* (2013.01)

(58) Field of Classification Search
CPC ............. F01N 2900/1404; F01N 3/106; F01N 3/2006; F01N 2560/07; F01N 2900/1402; F01N 2900/1406; F01N 2900/1411; F01N 2900/1812; F01N 3/2033; F02D 41/1446; F02D 41/0275; F02D 41/024; F02D 41/027; F02D 41/0245; F02D 41/405; F02D 2200/0802; F02D 2200/101; F02D 41/0055; F02D 41/0235; F02D 41/029; F02D 41/1461; G01M 15/102; F02M 26/15; F02M 26/49; G05B 23/0283
USPC ......... 60/274, 286, 276, 277, 285, 287, 301, 60/297, 303, 273, 282, 299, 288, 39.5; 123/703; 73/23.31, 114.69, 114.71, 73/25.01, 114.75
See application file for complete search history.

(56) References Cited

U.S. PATENT DOCUMENTS

| | | | |
|---|---|---|---|
| 7,853,436 B2 | 12/2010 | McConnell et al. | |
| 7,877,235 B2 | 1/2011 | McConnell et al. | |
| 8,197,752 B2 | 6/2012 | Nojima et al. | |
| 9,297,286 B2* | 3/2016 | Kruer | F01N 3/08 |
| 2002/0134083 A1* | 9/2002 | Staphanos | G05B 23/0208 60/698 |
| 2003/0200022 A1* | 10/2003 | Streichsbier | F01N 9/002 701/108 |
| 2008/0201054 A1* | 8/2008 | Grichnik | B60W 40/00 701/102 |
| 2012/0166096 A1 | 6/2012 | Stephenson et al. | |
| 2013/0173074 A1* | 7/2013 | Chandler | F02C 9/40 700/287 |

OTHER PUBLICATIONS

WayBack Machine Capture of Nett Technologies, Inc. Webpage, Mar. 2013.*

Lee, Estimation of Fuel Consumption using In-Vehicle Parameters, Dec. 2011.*

* cited by examiner

| Application / Market | No. of Cyl. | Engine Displ. (liters) | Rated Speed (rpm) | Rated Power (hp) | Rated Torque (ft-lb) | Est. Lambda @ 1g/hp-hr BSNOx | BSNOx 1.5g/hp-hr | 1g/hp-hr | 0.5g/hp-hr | 0.25g/hp-hr |
|---|---|---|---|---|---|---|---|---|---|---|
|  |  |  |  |  |  |  | g/s |  |  |  |
| Gas Compression | 12 | 78.3 | 1400 | 1567 | 5879 | 1.7 | 0.653 | 0.435 | 0.218 | 0.109 |
| Gas Compression | 16 | 104.3 | 1400 | 2089 | 7839 | 1.7 | 0.871 | 0.580 | 0.290 | 0.145 |
| Gas Compression | 20 | 130.4 | 1400 | 2612 | 9798 | 1.7 | 1.088 | 0.726 | 0.363 | 0.181 |
| Gas Compression | 12 | 78.3 | 1200 | 1343 | 5879 | 1.7 | 0.560 | 0.373 | 0.187 | 0.093 |
| Gas Compression | 16 | 104.3 | 1200 | 1791 | 7839 | 1.7 | 0.746 | 0.497 | 0.249 | 0.124 |
| Gas Compression | 20 | 130.4 | 1200 | 2239 | 9798 | 1.7 | 0.933 | 0.622 | 0.311 | 0.155 |
| Robust Power Gen. | 12 | 78.3 | 1500 | 2505 | 8772 | 1.75 | 1.044 | 0.696 | 0.348 | 0.174 |
| Robust Power Gen. | 16 | 104.3 | 1500 | 3341 | 11697 | 1.75 | 1.392 | 0.928 | 0.464 | 0.232 |
| Robust Power Gen. | 20 | 130.4 | 1500 | 4176 | 14621 | 1.75 | 1.740 | 1.160 | 0.580 | 0.290 |
| Robust Power Gen. | 12 | 78.3 | 1200 | 2088 | 9140 | 1.75 | 0.870 | 0.580 | 0.290 | 0.145 |
| Robust Power Gen. | 16 | 104.3 | 1200 | 2784 | 12186 | 1.75 | 1.160 | 0.773 | 0.387 | 0.193 |
| Robust Power Gen. | 20 | 130.4 | 1200 | 3481 | 15233 | 1.75 | 1.450 | 0.967 | 0.483 | 0.242 |
| High Eff. Power Gen. | 12 | 78.3 | 1500 | 3411 | 11941 | 2 | 1.421 | 0.947 | 0.474 | 0.237 |
| High Eff. Power Gen. | 16 | 104.3 | 1500 | 4547 | 15922 | 2 | 1.895 | 1.263 | 0.632 | 0.316 |
| High Eff. Power Gen. | 20 | 130.4 | 1500 | 5684 | 19902 | 2 | 2.368 | 1.579 | 0.789 | 0.395 |
| High Eff. Power Gen. | 12 | 78.3 | 1200 | 2728 | 11941 | 2 | 1.137 | 0.758 | 0.379 | 0.189 |
| High Eff. Power Gen. | 16 | 104.3 | 1200 | 3638 | 15922 | 2 | 1.516 | 1.011 | 0.505 | 0.253 |
| High Eff. Power Gen. | 20 | 130.4 | 1200 | 4547 | 19902 | 2 | 1.895 | 1.263 | 0.632 | 0.316 |

FIG. 12

| Application / Market | No. of Cyl. | Engine Displ. (liters) | Rated Speed (rpm) | Rated Power (hp) | Rated Torque (ft-lb) | Est. Lambda @ 1g/hp-hr BSNOx | BSNOx 1.5g/hp-hr | 1g/hp-hr | 0.5g/hp-hr | 0.25g/hp-hr |
|---|---|---|---|---|---|---|---|---|---|---|
| | | | | | | | g/s | | | |
| Gas Compression | 12 | 78.3 | 1400 | 1567 | 5879 | 1.7 | 0.653 | 0.435 | 0.218 | 0.109 |
| Gas Compression | 16 | 104.3 | 1400 | 2089 | 7839 | 1.7 | 0.871 | 0.580 | 0.290 | 0.145 |
| Gas Compression | 20 | 130.4 | 1400 | 2612 | 9798 | 1.7 | 1.088 | 0.726 | 0.363 | 0.181 |
| | | | | | | | | | | |
| Gas Compression | 12 | 78.3 | 1200 | 1343 | 5879 | 1.7 | 0.560 | 0.373 | 0.187 | 0.093 |
| Gas Compression | 16 | 104.3 | 1200 | 1791 | 7839 | 1.7 | 0.746 | 0.497 | 0.249 | 0.124 |
| Gas Compression | 20 | 130.4 | 1200 | 2239 | 9798 | 1.7 | 0.933 | 0.622 | 0.311 | 0.155 |
| | | | | | | | | | | |
| Robust Power Gen. | 12 | 78.3 | 1500 | 2505 | 8772 | 1.75 | 1.044 | 0.696 | 0.348 | 0.174 |
| Robust Power Gen. | 16 | 104.3 | 1500 | 3341 | 11697 | 1.75 | 1.392 | 0.928 | 0.464 | 0.232 |
| Robust Power Gen. | 20 | 130.4 | 1500 | 4176 | 14621 | 1.75 | 1.740 | 1.160 | 0.580 | 0.290 |
| | | | | | | | | | | |
| Robust Power Gen. | 12 | 78.3 | 1200 | 2088 | 9140 | 1.75 | 0.870 | 0.580 | 0.290 | 0.145 |
| Robust Power Gen. | 16 | 104.3 | 1200 | 2784 | 12186 | 1.75 | 1.160 | 0.773 | 0.387 | 0.193 |
| Robust Power Gen. | 20 | 130.4 | 1200 | 3481 | 15233 | 1.75 | 1.450 | 0.967 | 0.483 | 0.242 |
| | | | | | | | | | | |
| High Eff. Power Gen. | 12 | 78.3 | 1500 | 3411 | 11941 | 2 | 1.421 | 0.947 | 0.474 | 0.237 |
| High Eff. Power Gen. | 16 | 104.3 | 1500 | 4547 | 15922 | 2 | 1.895 | 1.263 | 0.632 | 0.316 |
| High Eff. Power Gen. | 20 | 130.4 | 1500 | 5684 | 19902 | 2 | 2.368 | 1.579 | 0.789 | 0.395 |
| | | | | | | | | | | |
| High Eff. Power Gen. | 12 | 78.3 | 1200 | 2728 | 11941 | 2 | 1.137 | 0.758 | 0.379 | 0.189 |
| High Eff. Power Gen. | 16 | 104.3 | 1200 | 3638 | 15922 | 2 | 1.516 | 1.011 | 0.505 | 0.253 |
| High Eff. Power Gen. | 20 | 130.4 | 1200 | 4547 | 19902 | 2 | 1.895 | 1.263 | 0.632 | 0.316 |

FIG. 13

| Application / Market | No. of Cyl. | Engine Displ. (liters) | Rated Speed (rpm) | Rated Power (hp) | Rated Torque (ft-lb) | Est. Lambda @ 1g/hp-hr BSNOx | BSCO ~2.0g/hp-hr g/s |
|---|---|---|---|---|---|---|---|
| Gas Compression | 12 | 78.3 | 1400 | 1567 | 5879 | 1.7 | 0.87 |
| Gas Compression | 16 | 104.3 | 1400 | 2089 | 7839 | 1.7 | 1.16 |
| Gas Compression | 20 | 130.4 | 1400 | 2612 | 9798 | 1.7 | 1.45 |
| Gas Compression | 12 | 78.3 | 1200 | 1343 | 5879 | 1.7 | 0.75 |
| Gas Compression | 16 | 104.3 | 1200 | 1791 | 7839 | 1.7 | 0.99 |
| Gas Compression | 20 | 130.4 | 1200 | 2239 | 9798 | 1.7 | 1.24 |
| Robust Power Gen. | 12 | 78.3 | 1500 | 2505 | 8772 | 1.75 | 1.39 |
| Robust Power Gen. | 16 | 104.3 | 1500 | 3341 | 11697 | 1.75 | 1.86 |
| Robust Power Gen. | 20 | 130.4 | 1500 | 4176 | 14621 | 1.75 | 2.32 |
| Robust Power Gen. | 12 | 78.3 | 1200 | 2088 | 9140 | 1.75 | 1.16 |
| Robust Power Gen. | 16 | 104.3 | 1200 | 2784 | 12186 | 1.75 | 1.55 |
| Robust Power Gen. | 20 | 130.4 | 1200 | 3481 | 15233 | 1.75 | 1.93 |
| High Eff. Power Gen. | 12 | 78.3 | 1500 | 3411 | 11941 | 2 | 1.89 |
| High Eff. Power Gen. | 16 | 104.3 | 1500 | 4547 | 15922 | 2 | 2.53 |
| High Eff. Power Gen. | 20 | 130.4 | 1500 | 5684 | 19902 | 2 | 3.16 |
| High Eff. Power Gen. | 12 | 78.3 | 1200 | 2728 | 11941 | 2 | 1.52 |
| High Eff. Power Gen. | 16 | 104.3 | 1200 | 3638 | 15922 | 2 | 2.02 |
| High Eff. Power Gen. | 20 | 130.4 | 1200 | 4547 | 19902 | 2 | 2.53 |

FIG. 14

| Application / Market | No. of Cyl. | Engine Displ. (liters) | Rated Speed (rpm) | Rated Power (hp) | Rated Torque (ft-lb) | Est. Lambda @ 1g/hp-hr BSNOx | BSCO ~2.0g/hp-hr g/s |
|---|---|---|---|---|---|---|---|
| Gas Compression | 12 | 78.3 | 1400 | 1567 | 5879 | 1.7 | 0.87 |
| Gas Compression | 16 | 104.3 | 1400 | 2089 | 7839 | 1.7 | 1.16 |
| Gas Compression | 20 | 130.4 | 1400 | 2612 | 9798 | 1.7 | 1.45 |
|  |  |  |  |  |  |  |  |
| Gas Compression | 12 | 78.3 | 1200 | 1343 | 5879 | 1.7 | 0.75 |
| Gas Compression | 16 | 104.3 | 1200 | 1791 | 7839 | 1.7 | 0.99 |
| Gas Compression | 20 | 130.4 | 1200 | 2239 | 9798 | 1.7 | 1.24 |
|  |  |  |  |  |  |  |  |
| Robust Power Gen. | 12 | 78.3 | 1500 | 2505 | 8772 | 1.75 | 1.39 |
| Robust Power Gen. | 16 | 104.3 | 1500 | 3341 | 11697 | 1.75 | 1.86 |
| Robust Power Gen. | 20 | 130.4 | 1500 | 4176 | 14621 | 1.75 | 2.32 |
|  |  |  |  |  |  |  |  |
| Robust Power Gen. | 12 | 78.3 | 1200 | 2088 | 9140 | 1.75 | 1.16 |
| Robust Power Gen. | 16 | 104.3 | 1200 | 2784 | 12186 | 1.75 | 1.55 |
| Robust Power Gen. | 20 | 130.4 | 1200 | 3481 | 15233 | 1.75 | 1.93 |
|  |  |  |  |  |  |  |  |
| High Eff. Power Gen. | 12 | 78.3 | 1500 | 3411 | 11941 | 2 | 1.89 |
| High Eff. Power Gen. | 16 | 104.3 | 1500 | 4547 | 15922 | 2 | 2.53 |
| High Eff. Power Gen. | 20 | 130.4 | 1500 | 5684 | 19902 | 2 | 3.16 |
|  |  |  |  |  |  |  |  |
| High Eff. Power Gen. | 12 | 78.3 | 1200 | 2728 | 11941 | 2 | 1.52 |
| High Eff. Power Gen. | 16 | 104.3 | 1200 | 3638 | 15922 | 2 | 2.02 |
| High Eff. Power Gen. | 20 | 130.4 | 1200 | 4547 | 19902 | 2 | 2.53 |

FIG. 15

| Application / Market | No. of Cyl. | Engine Displ. (liters) | Rated Speed (rpm) | Rated Power (hp) | Rated Torque (ft-lb) | Est. Lambda 1g/hp-hr | 1g/hp-hr (kg/s) | 0.5g/hp-hr (kg/s) | 0.25g/hp-hr (kg/s) | 1g/hp-hr (SCFM) | 0.5g/hp-hr (SCFM) | 0.25g/hp-hr (SCFM) |
|---|---|---|---|---|---|---|---|---|---|---|---|---|
| Gas Compression | 12 | 78.3 | 1400 | 1567 | 5879 | 1.7 | 1.800 | 1.847 | 1.895 | 3196 | 3278 | 3365 |
| Gas Compression | 16 | 104.3 | 1400 | 2089 | 7839 | 1.7 | 2.401 | 2.462 | 2.527 | 4262 | 4371 | 4486 |
| Gas Compression | 20 | 130.4 | 1400 | 2612 | 9798 | 1.7 | 3.001 | 3.078 | 3.159 | 5327 | 5464 | 5608 |
| Gas Compression | 12 | 78.3 | 1200 | 1343 | 5879 | 1.7 | 1.543 | 1.583 | 1.624 | 2740 | 2810 | 2884 |
| Gas Compression | 16 | 104.3 | 1200 | 1791 | 7839 | 1.7 | 2.058 | 2.110 | 2.166 | 3653 | 3747 | 3845 |
| Gas Compression | 20 | 130.4 | 1200 | 2239 | 9798 | 1.7 | 2.572 | 2.638 | 2.707 | 4566 | 4683 | 4807 |
| Robust Power Gen. | 12 | 78.3 | 1500 | 2505 | 8772 | 1.75 | 2.722 | 2.819 | 2.924 | 4833 | 5005 | 5191 |
| Robust Power Gen. | 16 | 104.3 | 1500 | 3341 | 11697 | 1.75 | 3.630 | 3.759 | 3.898 | 6444 | 6674 | 6921 |
| Robust Power Gen. | 20 | 130.4 | 1500 | 4176 | 14621 | 1.75 | 4.537 | 4.699 | 4.873 | 8055 | 8342 | 8651 |
| Robust Power Gen. | 12 | 78.3 | 1200 | 2088 | 9140 | 1.75 | 2.269 | 2.350 | 2.437 | 4028 | 4172 | 4327 |
| Robust Power Gen. | 16 | 104.3 | 1200 | 2784 | 12186 | 1.75 | 3.025 | 3.133 | 3.249 | 5371 | 5563 | 5769 |
| Robust Power Gen. | 20 | 130.4 | 1200 | 3481 | 15233 | 1.75 | 3.782 | 3.917 | 4.062 | 6714 | 6953 | 7211 |
| High Eff. Power Gen. | 12 | 78.3 | 1500 | 3411 | 11941 | 2 | 4.077 | 4.169 | 4.266 | 7238 | 7402 | 7574 |
| High Eff. Power Gen. | 16 | 104.3 | 1500 | 4547 | 15922 | 2 | 5.436 | 5.559 | 5.689 | 9650 | 9870 | 10099 |
| High Eff. Power Gen. | 20 | 130.4 | 1500 | 5684 | 19902 | 2 | 6.795 | 6.949 | 7.111 | 12063 | 12337 | 12624 |
| High Eff. Power Gen. | 12 | 78.3 | 1200 | 2728 | 11941 | 2 | 3.261 | 3.336 | 3.413 | 5790 | 5922 | 6059 |
| High Eff. Power Gen. | 16 | 104.3 | 1200 | 3638 | 15922 | 2 | 4.349 | 4.447 | 4.551 | 7720 | 7896 | 8079 |
| High Eff. Power Gen. | 20 | 130.4 | 1200 | 4547 | 19902 | 2 | 5.436 | 5.559 | 5.689 | 9650 | 9870 | 10099 |

FIG. 16

| Application / Market | No. of Cyl. | Engine Displ. (liters) | Rated Speed (rpm) | Rated BMEP (psi) | Rated Power (hp) | Rated Torque (ft-lb) | Est. Lambda @ 1g/hp-hr BSNOx | 1g/hp-hr (kg/s) | 0.5g/hp-hr (kg/s) | 0.25g/hp-hr (kg/s) | 1g/hp-hr (SCFM) | 0.5g/hp-hr (SCFM) | 0.25g/hp-hr (SCFM) |
|---|---|---|---|---|---|---|---|---|---|---|---|---|---|
| Gas Compression | 12 | 78.3 | 1400 | 186 | 1567 | 5879 | 1.7 | 1.946 | 1.999 | 2.054 | 3455 | 3549 | 3647 |
| Gas Compression | 16 | 104.3 | 1400 | 186 | 2089 | 7839 | 1.7 | 2.595 | 2.665 | 2.739 | 4607 | 4732 | 4863 |
| Gas Compression | 20 | 130.4 | 1400 | 186 | 2612 | 9798 | 1.7 | 3.244 | 3.332 | 3.424 | 5759 | 5915 | 6079 |
| Gas Compression | 12 | 78.3 | 1200 | 186 | 1343 | 5879 | 1.7 | 1.668 | 1.713 | 1.761 | 2962 | 3042 | 3126 |
| Gas Compression | 16 | 104.3 | 1200 | 186 | 1791 | 7839 | 1.7 | 2.224 | 2.285 | 2.348 | 3949 | 4056 | 4169 |
| Gas Compression | 20 | 130.4 | 1200 | 186 | 2239 | 9798 | 1.7 | 2.781 | 2.856 | 2.935 | 4936 | 5070 | 5211 |
| Robust Power Gen. | 12 | 78.3 | 1500 | 277 | 2505 | 8772 | 1.75 | 3.421 | 3.464 | 3.599 | 6074 | 6149 | 6389 |
| Robust Power Gen. | 16 | 104.3 | 1500 | 277 | 3341 | 11697 | 1.75 | 4.561 | 4.618 | 4.798 | 8098 | 8199 | 8519 |
| Robust Power Gen. | 20 | 130.4 | 1500 | 277 | 4176 | 14621 | 1.75 | 5.702 | 5.773 | 5.998 | 10123 | 10249 | 10648 |
| Robust Power Gen. | 12 | 78.3 | 1200 | 289 | 2088 | 9140 | 1.75 | 2.851 | 2.887 | 3.000 | 5062 | 5126 | 5325 |
| Robust Power Gen. | 16 | 104.3 | 1200 | 289 | 2784 | 12186 | 1.75 | 3.802 | 3.849 | 3.999 | 6750 | 6834 | 7100 |
| Robust Power Gen. | 20 | 130.4 | 1200 | 289 | 3481 | 15233 | 1.75 | 4.752 | 4.812 | 4.999 | 8437 | 8543 | 8875 |
| High Eff. Power Gen. | 12 | 78.3 | 1500 | 377 | 3411 | 11941 | 2 | 4.896 | 5.013 | 5.135 | 8592 | 8899 | 9116 |
| High Eff. Power Gen. | 16 | 104.3 | 1500 | 377 | 4547 | 15922 | 2 | 6.528 | 6.684 | 6.847 | 11590 | 11866 | 12155 |
| High Eff. Power Gen. | 20 | 130.4 | 1500 | 377 | 5684 | 19902 | 2 | 8.160 | 8.355 | 8.558 | 14487 | 14832 | 15194 |
| High Eff. Power Gen. | 12 | 78.3 | 1200 | 377 | 2728 | 11941 | 2 | 3.917 | 4.010 | 4.108 | 6954 | 7119 | 7293 |
| High Eff. Power Gen. | 16 | 104.3 | 1200 | 377 | 3638 | 15922 | 2 | 5.223 | 5.347 | 5.477 | 9272 | 9493 | 9724 |
| High Eff. Power Gen. | 20 | 130.4 | 1200 | 377 | 4547 | 19902 | 2 | 6.528 | 6.684 | 6.847 | 11590 | 11866 | 12155 |

FIG. 17

| Application / Market | No. of Cyl. | Engine Displ. (liters) | Rated Speed (rpm) | Rated Power (hp) | Rated Torque (ft-lb) | Est. Lambda 1g/hp-hr | Intake Air Flow Rate | | | | | |
|---|---|---|---|---|---|---|---|---|---|---|---|---|
| | | | | | | | 1g/hp-hr | 0.5g/hp-hr | 0.25g/hp-hr | 1g/hp-hr | 0.5g/hp-hr | 0.25g/hp-hr |
| | | | | | | | kg/s | | | SCFM (60F, 14.696psia, 0% RH) | | |
| Gas Compression | 12 | 78.3 | 1400 | 1567 | 5879 | 1.7 | 1.739 | 1.784 | 1.831 | 3013 | 3090 | 3172 |
| Gas Compression | 16 | 104.3 | 1400 | 2089 | 7839 | 1.7 | 2.319 | 2.378 | 2.441 | 4018 | 4121 | 4229 |
| Gas Compression | 20 | 130.4 | 1400 | 2612 | 9798 | 1.7 | 2.899 | 2.973 | 3.051 | 5022 | 5151 | 5286 |
| Gas Compression | 12 | 78.3 | 1200 | 1343 | 5879 | 1.7 | 1.491 | 1.529 | 1.569 | 2583 | 2649 | 2719 |
| Gas Compression | 16 | 104.3 | 1200 | 1791 | 7839 | 1.7 | 1.988 | 2.039 | 2.092 | 3444 | 3532 | 3625 |
| Gas Compression | 20 | 130.4 | 1200 | 2239 | 9798 | 1.7 | 2.485 | 2.548 | 2.615 | 4305 | 4415 | 4531 |
| Robust Power Gen. | 12 | 78.3 | 1500 | 2505 | 8772 | 1.75 | 2.632 | 2.726 | 2.827 | 4560 | 4723 | 4898 |
| Robust Power Gen. | 16 | 104.3 | 1500 | 3341 | 11697 | 1.75 | 3.509 | 3.635 | 3.769 | 6080 | 6297 | 6530 |
| Robust Power Gen. | 20 | 130.4 | 1500 | 4176 | 14621 | 1.75 | 4.387 | 4.543 | 4.712 | 7600 | 7872 | 8163 |
| Robust Power Gen. | 12 | 78.3 | 1200 | 2088 | 9140 | 1.75 | 2.194 | 2.272 | 2.356 | 3801 | 3937 | 4082 |
| Robust Power Gen. | 16 | 104.3 | 1200 | 2784 | 12186 | 1.75 | 2.925 | 3.030 | 3.142 | 5068 | 5249 | 5443 |
| Robust Power Gen. | 20 | 130.4 | 1200 | 3481 | 15233 | 1.75 | 3.656 | 3.787 | 3.927 | 6335 | 6561 | 6804 |
| High Eff. Power Gen. | 12 | 78.3 | 1500 | 3411 | 11941 | 2 | 3.958 | 4.048 | 4.142 | 6858 | 7014 | 7177 |
| High Eff. Power Gen. | 16 | 104.3 | 1500 | 4547 | 15922 | 2 | 5.278 | 5.398 | 5.523 | 9144 | 9351 | 9569 |
| High Eff. Power Gen. | 20 | 130.4 | 1500 | 5684 | 19902 | 2 | 6.597 | 6.747 | 6.904 | 11430 | 11689 | 11961 |
| High Eff. Power Gen. | 12 | 78.3 | 1200 | 2728 | 11941 | 2 | 3.167 | 3.239 | 3.314 | 5486 | 5611 | 5741 |
| High Eff. Power Gen. | 16 | 104.3 | 1200 | 3638 | 15922 | 2 | 4.222 | 4.318 | 4.419 | 7315 | 7481 | 7655 |
| High Eff. Power Gen. | 20 | 130.4 | 1200 | 4547 | 19902 | 2 | 5.278 | 5.398 | 5.523 | 9144 | 9351 | 9569 |

FIG. 18

| Application / Market | No. of Cyl. | Engine Displ. (liters) | Rated Speed (rpm) | Rated BMEP (psi) | Rated Power (hp) | Rated Torque (ft-lb) | Est. Lambda @ 1g/hp-hr BSNOx | Intake Air Flow Rate | | | | | |
|---|---|---|---|---|---|---|---|---|---|---|---|---|---|
| | | | | | | | | 1g/hp-hr | 0.5g/hp-hr | 0.25g/hp-hr | 1g/hp-hr | 0.5g/hp-hr | 0.25g/hp-hr |
| | | | | | | | | kg/s | | | SCFM (60F, 14.696psia, 0% RH) | | |
| Gas Compression | 12 | 78.3 | 1400 | 186 | 1567 | 5879 | 1.7 | 1.795 | 1.844 | 1.895 | 3111 | 3195 | 3284 |
| Gas Compression | 16 | 104.3 | 1400 | 186 | 2089 | 7839 | 1.7 | 2.394 | 2.459 | 2.527 | 4148 | 4260 | 4378 |
| Gas Compression | 20 | 130.4 | 1400 | 186 | 2612 | 9798 | 1.7 | 2.992 | 3.073 | 3.159 | 5184 | 5325 | 5473 |
| Gas Compression | 12 | 78.3 | 1200 | 186 | 1343 | 5879 | 1.7 | 1.539 | 1.581 | 1.624 | 2666 | 2738 | 2814 |
| Gas Compression | 16 | 104.3 | 1200 | 186 | 1791 | 7839 | 1.7 | 2.052 | 2.107 | 2.166 | 3555 | 3651 | 3753 |
| Gas Compression | 20 | 130.4 | 1200 | 186 | 2239 | 9798 | 1.7 | 2.565 | 2.634 | 2.707 | 4444 | 4564 | 4691 |
| Robust Power Gen. | 12 | 78.3 | 1500 | 277 | 2505 | 8772 | 1.75 | 2.785 | 2.819 | 2.929 | 4824 | 4885 | 5075 |
| Robust Power Gen. | 16 | 104.3 | 1500 | 277 | 3341 | 11697 | 1.75 | 3.713 | 3.759 | 3.906 | 6432 | 6513 | 6766 |
| Robust Power Gen. | 20 | 130.4 | 1500 | 277 | 4176 | 14621 | 1.75 | 4.641 | 4.699 | 4.882 | 8040 | 8141 | 8458 |
| Robust Power Gen. | 12 | 78.3 | 1200 | 289 | 2088 | 9140 | 1.75 | 2.321 | 2.350 | 2.442 | 4021 | 4071 | 4230 |
| Robust Power Gen. | 16 | 104.3 | 1200 | 289 | 2784 | 12186 | 1.75 | 3.095 | 3.133 | 3.255 | 5361 | 5428 | 5640 |
| Robust Power Gen. | 20 | 130.4 | 1200 | 289 | 3481 | 15233 | 1.75 | 3.868 | 3.917 | 4.069 | 6702 | 6786 | 7050 |
| High Eff. Power Gen. | 12 | 78.3 | 1500 | 377 | 3411 | 11941 | 2 | 4.080 | 4.177 | 4.279 | 7069 | 7237 | 7414 |
| High Eff. Power Gen. | 16 | 104.3 | 1500 | 377 | 4547 | 15922 | 2 | 5.440 | 5.570 | 5.706 | 9425 | 9650 | 9885 |
| High Eff. Power Gen. | 20 | 130.4 | 1500 | 377 | 5684 | 19902 | 2 | 6.800 | 6.962 | 7.132 | 11781 | 12062 | 12356 |
| High Eff. Power Gen. | 12 | 78.3 | 1200 | 377 | 2728 | 11941 | 2 | 3.264 | 3.342 | 3.423 | 5655 | 5790 | 5931 |
| High Eff. Power Gen. | 16 | 104.3 | 1200 | 377 | 3638 | 15922 | 2 | 4.352 | 4.456 | 4.564 | 7540 | 7720 | 7908 |
| High Eff. Power Gen. | 20 | 130.4 | 1200 | 377 | 4547 | 19902 | 2 | 5.440 | 5.570 | 5.706 | 9425 | 9650 | 9885 |

FIG. 19

| Application / Market | No. of Cyl. | Engine Displ. (liters) | Rated Speed (rpm) | Rated Power (hp) | Rated Torque (ft-lb) | Est. Lambda @ 1g/hp-hr BSNOx | Fuel Flow rate | | | | | |
|---|---|---|---|---|---|---|---|---|---|---|---|---|
| | | | | | | | 1g/hp-hr | 0.5g/hp-hr | 0.25g/hp-hr | 1g/hp-hr | 0.5g/hp-hr | 0.25g/hp-hr |
| | | | | | | | kg/s | | | lb/hr | | |
| Gas Compression | 12 | 78.3 | 1400 | 1567 | 5879 | 1.7 | 0.061 | 0.063 | 0.064 | 486.2 | 498.7 | 511.8 |
| Gas Compression | 16 | 104.3 | 1400 | 2089 | 7839 | 1.7 | 0.082 | 0.084 | 0.086 | 648.3 | 664.9 | 682.4 |
| Gas Compression | 20 | 130.4 | 1400 | 2612 | 9798 | 1.7 | 0.102 | 0.105 | 0.107 | 810.3 | 831.1 | 853.0 |
| Gas Compression | 12 | 78.3 | 1200 | 1343 | 5879 | 1.7 | 0.053 | 0.054 | 0.055 | 416.7 | 427.4 | 438.7 |
| Gas Compression | 16 | 104.3 | 1200 | 1791 | 7839 | 1.7 | 0.070 | 0.072 | 0.074 | 555.7 | 569.9 | 584.9 |
| Gas Compression | 20 | 130.4 | 1200 | 2239 | 9798 | 1.7 | 0.088 | 0.090 | 0.092 | 694.6 | 712.4 | 731.1 |
| Robust Power Gen. | 12 | 78.3 | 1500 | 2505 | 8772 | 1.75 | 0.090 | 0.093 | 0.097 | 714.8 | 740.3 | 767.7 |
| Robust Power Gen. | 16 | 104.3 | 1500 | 3341 | 11697 | 1.75 | 0.120 | 0.124 | 0.129 | 953.1 | 987.1 | 1023.7 |
| Robust Power Gen. | 20 | 130.4 | 1500 | 4176 | 14621 | 1.75 | 0.150 | 0.155 | 0.161 | 1191.3 | 1233.9 | 1279.6 |
| Robust Power Gen. | 12 | 78.3 | 1200 | 2088 | 9140 | 1.75 | 0.075 | 0.078 | 0.081 | 595.8 | 617.1 | 639.9 |
| Robust Power Gen. | 16 | 104.3 | 1200 | 2784 | 12186 | 1.75 | 0.100 | 0.104 | 0.108 | 794.4 | 822.7 | 853.2 |
| Robust Power Gen. | 20 | 130.4 | 1200 | 3481 | 15233 | 1.75 | 0.125 | 0.130 | 0.134 | 993.0 | 1028.4 | 1066.5 |
| High Eff. Power Gen. | 12 | 78.3 | 1500 | 3411 | 11941 | 2 | 0.119 | 0.121 | 0.124 | 940.6 | 962.0 | 984.3 |
| High Eff. Power Gen. | 16 | 104.3 | 1500 | 4547 | 15922 | 2 | 0.158 | 0.162 | 0.165 | 1254.1 | 1282.6 | 1312.4 |
| High Eff. Power Gen. | 20 | 130.4 | 1500 | 5684 | 19902 | 2 | 0.198 | 0.202 | 0.207 | 1567.6 | 1603.3 | 1640.5 |
| High Eff. Power Gen. | 12 | 78.3 | 1200 | 2728 | 11941 | 2 | 0.095 | 0.097 | 0.099 | 752.5 | 769.6 | 787.5 |
| High Eff. Power Gen. | 16 | 104.3 | 1200 | 3638 | 15922 | 2 | 0.126 | 0.129 | 0.132 | 1003.3 | 1026.1 | 1049.9 |
| High Eff. Power Gen. | 20 | 130.4 | 1200 | 4547 | 19902 | 2 | 0.158 | 0.162 | 0.165 | 1254.1 | 1282.6 | 1312.4 |

FIG. 20

| Application / Market | No. of Cyl. | Engine Displ. (liters) | Rated Speed (rpm) | Rated Power (hp) | Rated Torque (ft-lb) | Est. Lambda @ 1g/hp-hr BSNOx | Fuel Flow rate | | | | | |
|---|---|---|---|---|---|---|---|---|---|---|---|---|
| | | | | | | | 1g/hp-hr | 0.5g/hp-hr | 0.25g/hp-hr | 1g/hp-hr | 0.5g/hp-hr | 0.25g/hp-hr |
| | | | | | | | kg/s | | | lb/hr | | |
| Gas Compression | 12 | 78.3 | 1400 | 1567 | 5879 | 1.7 | 0.151 | 0.155 | 0.159 | 1197.5 | 1229.8 | 1264.0 |
| Gas Compression | 16 | 104.3 | 1400 | 2089 | 7839 | 1.7 | 0.201 | 0.207 | 0.212 | 1596.6 | 1639.8 | 1685.3 |
| Gas Compression | 20 | 130.4 | 1400 | 2612 | 9798 | 1.7 | 0.251 | 0.258 | 0.265 | 1995.8 | 2049.7 | 2106.7 |
| Gas Compression | 12 | 78.3 | 1200 | 1343 | 5879 | 1.7 | 0.129 | 0.133 | 0.137 | 1026.4 | 1054.2 | 1083.4 |
| Gas Compression | 16 | 104.3 | 1200 | 1791 | 7839 | 1.7 | 0.172 | 0.177 | 0.182 | 1368.6 | 1405.5 | 1444.6 |
| Gas Compression | 20 | 130.4 | 1200 | 2239 | 9798 | 1.7 | 0.216 | 0.221 | 0.228 | 1710.7 | 1756.9 | 1805.7 |
| Robust Power Gen. | 12 | 78.3 | 1500 | 2505 | 8772 | 1.75 | 0.636 | 0.644 | 0.670 | 5051.4 | 5114.6 | 5313.8 |
| Robust Power Gen. | 16 | 104.3 | 1500 | 3341 | 11697 | 1.75 | 0.849 | 0.859 | 0.893 | 6735.2 | 6819.4 | 7085.1 |
| Robust Power Gen. | 20 | 130.4 | 1500 | 4176 | 14621 | 1.75 | 1.061 | 1.074 | 1.116 | 8419.0 | 8524.3 | 8856.4 |
| Robust Power Gen. | 12 | 78.3 | 1200 | 2088 | 9140 | 1.75 | 0.531 | 0.537 | 0.558 | 4210.4 | 4263.0 | 4429.1 |
| Robust Power Gen. | 16 | 104.3 | 1200 | 2784 | 12186 | 1.75 | 0.707 | 0.716 | 0.744 | 5613.9 | 5684.0 | 5905.5 |
| Robust Power Gen. | 20 | 130.4 | 1200 | 3481 | 15233 | 1.75 | 0.884 | 0.895 | 0.930 | 7017.3 | 7105.0 | 7381.9 |
| High Eff. Power Gen. | 12 | 78.3 | 1500 | 3411 | 11941 | 2 | 0.816 | 0.835 | 0.856 | 6476.5 | 6630.7 | 6792.4 |
| High Eff. Power Gen. | 16 | 104.3 | 1500 | 4547 | 15922 | 2 | 1.088 | 1.114 | 1.141 | 8635.3 | 8840.9 | 9056.6 |
| High Eff. Power Gen. | 20 | 130.4 | 1500 | 5684 | 19902 | 2 | 1.360 | 1.392 | 1.426 | 10794.2 | 11051.2 | 11320.7 |
| High Eff. Power Gen. | 12 | 78.3 | 1200 | 2728 | 11941 | 2 | 0.653 | 0.668 | 0.685 | 5181.2 | 5304.6 | 5433.9 |
| High Eff. Power Gen. | 16 | 104.3 | 1200 | 3638 | 15922 | 2 | 0.870 | 0.891 | 0.913 | 6908.3 | 7072.7 | 7245.2 |
| High Eff. Power Gen. | 20 | 130.4 | 1200 | 4547 | 19902 | 2 | 1.088 | 1.114 | 1.141 | 8635.3 | 8840.9 | 9056.6 |

FIG. 21

| Load | 100% | 90% | 75% | 50% |
|---|---|---|---|---|
| Exh Temp °C | 461.5 | 473.5 | 487.4 | 531.8 |

| Load | 100 | 90 | 75 | 50 | 0 |
|---|---|---|---|---|---|
| % time at each pt | 25 | 25 | 25 | 25 | 0 |

SYSTEM AND METHOD FOR THE MONITORING AND CONTROLLING OF EMISSIONS FOR MULTIPLE ENGINES

CROSS-REFERENCE TO RELATED APPLICATIONS

This application claims the benefit of U.S. Provisional Patent Application No. 61/916,586 entitled, "SYSTEM AND METHOD FOR THE MONITORING AND CONTROLLING OF EMISSIONS FOR MULTIPLE ENGINES," filed Dec. 16, 2013, which is incorporated herein by reference in its entirety.

BACKGROUND

For internal combustion engines, such as diesel or natural gas engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber.

SUMMARY

One embodiment relates to an apparatus. The apparatus includes an emissions module structured to interpret data indicative of an emissions amount from a test cell system in a facility; an emissions threshold module structured to aggregate the emissions amount from each test cell system in the facility to determine a total emissions amount for the facility and compare the total emissions amount to a predetermined threshold for the facility; and an aftertreatment system control module structured to selectively control a component in an aftertreatment system associated with each test cell system responsive to the comparison of the total emissions amount to the predetermined threshold. According to one embodiment, the apparatus is utilized with a test engine facility, where the apparatus is structured to maintain a total emissions amount at or below the predetermined threshold. By dynamically controlling one or more aftertreatment system components, the apparatus is able to selectively maintain the total emissions amount (e.g., a $NO_x$, particulate matter, CO, $SO_x$ amount) at or below at least one of a regulated or an allowed corresponding emissions rate. Thus, the apparatus provides a technical solution of proactively controlling an emissions amount from a facility as opposed to simply monitoring an emissions amount.

Still another embodiment relates to a system. The system includes a test cell system including an engine and an aftertreatment system in exhaust fluid communication with the engine. The system also includes a central controller operatively coupled to the test cell system, the central controller structured to: receive data indicative of a first plurality of amounts of fuel consumed for a first plurality of temperature zones for the test cell system; determine a total emissions amount based, at least in part, on the received first plurality of amounts of fuel consumed for the first plurality of temperature zones; compare the total emissions amount to a predetermined threshold; and provide a value indicative of the comparison of the total emissions amount to the predetermined threshold. By interconnecting a central controller with one or more test cell systems in a facility, the facility improves the use of resources (e.g., separate and individual management of each test cell systems is substantially reduced) while also improving performance of the facility (e.g., dynamically managing emissions from one or more test cell systems within the facility to control the total amount of emissions from the facility). Technically, this structure provides for a relatively more efficient communications network (e.g., the use of a central controller interconnected with each test cell system in a facility reduces the bandwidth requirement if a separate controller was utilized to manage each test cell system individually) while also causing the system to operate in a relatively faster, more efficient manner.

A further embodiment relates to a method. The method includes receiving, by a controller, data indicative of a plurality of amounts of fuel consumed for a plurality of temperature zones of an engine in a plurality of engines; determining, by the controller, a total emissions amount based, at least in part, on the received plurality of amounts of fuel consumed for each engine in the plurality of engines; comparing, by the controller, the total emissions amount to a predetermined threshold; outputting, by the controller, a value indicative of the comparison of the total emissions amount to the predetermined threshold; and controlling, by the controller, a component of an aftertreatment system associated with each engine in the plurality of engines to maintain a total emissions amount for a facility housing the plurality of engines at or below the predetermined threshold.

One embodiment relates to a system for monitoring a total emission amount of a plurality of engines. The system includes a first controller configured to determine a first plurality of amounts of fuel consumed by a first engine of the plurality of engines for a first plurality of temperature zones; a second controller configured to determine a second plurality of amounts of fuel consumed by a second engine of the plurality of engines for a second plurality of temperature zones; and a central controller. The central controller is configured to: receive data indicative of the first plurality of amounts of fuel consumed for the first plurality of temperature zones and the second plurality of amounts of fuel consumed for the second plurality of temperature zones, determine a total emission amount based, at least in part, on the received first plurality of amounts of fuel consumed for the first plurality of temperature zones and the received second plurality of amounts of fuel consumed for the second plurality of temperature zones, compare the total emission amount to a predetermined threshold, and output a value indicative of the comparison of the total emission amount to the predetermined threshold.

Another embodiment relates to a system for dynamically modifying the efficiency of at least one aftertreatment system of an engine of a plurality of engines. The system includes a plurality of engines; a plurality of aftertreatment systems, each aftertreatment system in fluid communication with an exhaust of a corresponding engine of the plurality of engines; a plurality of controllers, each controller of the plurality of controllers associated with the corresponding engine of the plurality of engines, each controller configured to determine a plurality of amounts of fuel consumed by the corresponding engine of the plurality of engines for a plurality of temperature zones; and a central controller communicatively coupled to each controller of the plurality of controllers. The central controller is configured to receive, from each controller of the plurality of controllers, data indicative of the plurality of amounts of fuel consumed for the plurality of temperature zones of the corresponding engine of the plurality of engines, determine a total emission amount based, at least in part, on the received plurality of amounts of fuel consumed for the plurality of temperature zones from the each controller of the plurality of controllers, compare the total emission amount to a predetermined threshold, and output a command to at least one controller of the plurality of controllers to increase an efficiency of an aftertreatment system associated with the at least one controller responsive to the comparison of the total emission amount to the predetermined threshold being below a value.

Still another embodiment relates to a method. The method includes receiving, by a controller, data indicative of a plurality of amounts of fuel consumed for a plurality of temperature zones of an engine in a plurality of engines; determining, by the controller, a total emission amount based, at least in part, on the received plurality of amounts of fuel consumed for the plurality of temperature zones for the engine for the plurality of engines; comparing, by the controller, the total emission amount to a predetermined threshold; and outputting, by the controller, a value indicative of the comparison of the total emission amount to the predetermined threshold.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 12 depicts $NO_x$ concentrations for natural gas at the inlet of the aftertreatment system, which may vary up to plus or minus 15% based on humidity levels;

FIG. 13 depicts $NO_x$ concentrations for natural gas blended with $CO_2$ at the inlet of the aftertreatment system, which may vary up to plus or minus 15% based on humidity levels;

FIG. 14 depicts CO concentrations for natural gas at the inlet of the aftertreatment system;

FIG. 15 depicts CO concentrations for natural gas blended with $CO_2$ at the inlet of the aftertreatment system;

FIG. 16 depicts the exhaust flow rates for natural gas;

FIG. 17 depicts the exhaust flow rates for natural gas blended with $CO_2$;

FIG. 18 depicts the air intake flow rate for natural gas;

FIG. 19 depicts the air intake flow rate for natural gas blended with $CO_2$;

FIG. 20 depicts a fuel flow rate for natural gas;

FIG. 21 depicts a fuel flow rate for natural gas blended with $CO_2$;

Figure 1:
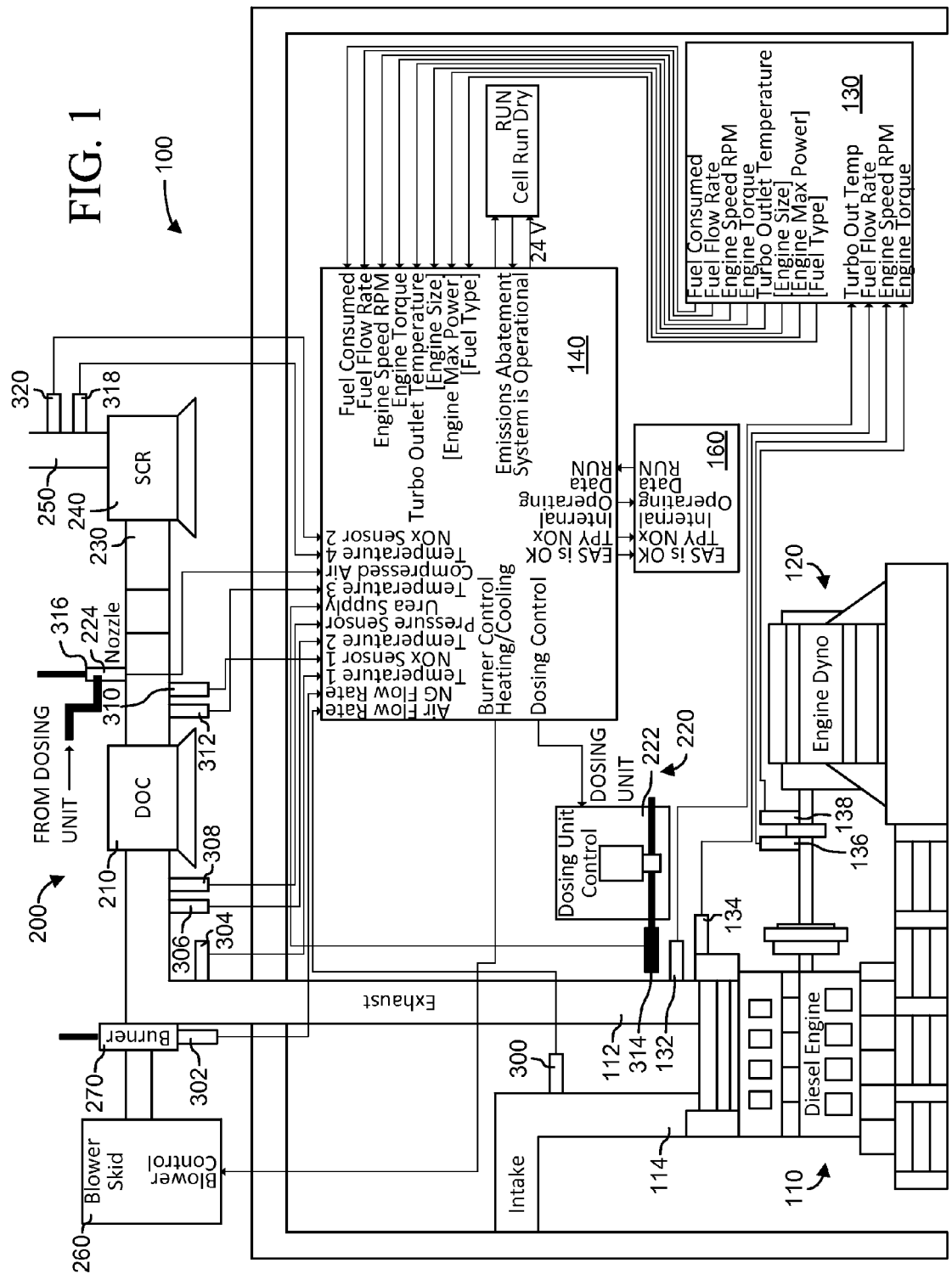
FIG. 1 is a schematic overview of an example system having an engine coupled to an aftertreatment system, a controller configured to determine a plurality of amounts of fuel consumed by the engine for a plurality of temperature zones, and a central controller configured to determine a total emission amount and compare the total emission amount to a threshold.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for monitoring the emissions from a plurality of engines relative to a predetermined threshold. The various concepts introduced above and discussed in greater detail below may be implemented in any of numerous ways, as the described concepts are not limited to any particular manner of implementation. Examples of specific implementations and applications are provided primarily for illustrative purposes.

As an engine is operated, an amount of an emission from the exhaust of the engine, such as $NO_x$, CO, sulfuric oxides ($SO_x$), particulate matter (PM) (e.g., soot and ash), etc., may need to be monitored to determine the amount of the emission from the engine that is released to atmosphere. In some implementations, several engines may be operated at a single facility, such as a facility for engine development testing and engine production testing (e.g., a facility with several engine test cells, etc.), an end user's facility (e.g., a power generation facility at a mining site, etc.), a location having several engines, etc. For facilities with several engines, several different amounts of emissions may be outputted by the different engines. In some implementations, the emissions may be output from the engine into an exhaust system having an aftertreatment system. The aftertreatment system is configured to convert the emissions compounds into more neutral compounds (e.g., converting $NO_x$ into diatomic nitrogen, converting CO to $CO_2$, etc.). In some instances, the various emissions compounds may have limits imposed such that the facility or location may emit some emissions, but should not exceed predetermined values. For example, limits may be set for the permissible amount of $NO_x$, $SO_x$, PM, and CO emissions that may be emitted to atmosphere over a period of time (e.g., a 12 month rolling average, etc.). To meet these limits, a central controller is structured to monitor the aggregate emissions from a plurality of engines and to modify an efficiency of one or more aftertreatment systems to stay at or below the set limit thresholds. In some implementations, such as a facility for engine development testing and engine production testing, the test cells may be equipped with a self-contained plant emissions control system. By implementing the central controller with the structure described and shown herein, the facility may be operated in an unexpected manner by dynamically managing one or more aftertreatment systems in the facility to proactively control an emissions amount from the facility. Accordingly, the central controller may improve the efficiency of the facility, reduce an amount of harmful emissions, and may be utilized with a relatively small amount of modification to existing facilities (e.g., providing the central controller and communicably coupling the central controller with the test cell systems in the facility).

According to the present disclosure, in addition to monitoring and/or modifying an efficiency of an aftertreatment system, the central controller may also provide reporting of data analysis regarding $NO_x$ reduction efficiency of one or more engines, catalyst temperatures of an aftertreatment system of one or more engines, inlet $NO_x$ emission amounts in an exhaust system of one or more engines, outlet $NO_x$ emission amounts in an exhaust system of one or more engines, total fuel burned during each temperature zone of one or more engines, tons per month or other time period of an emission (e.g., $NO_x$, PM, $SO_x$, CO, etc.) for a facility (i.e., an emissions factor times the total fuel burned by the engines of the facility), etc. The foregoing data may be received by the central controller from a controller associated with each engine and aftertreatment system (i.e., at least part of a test cell system). In some embodiments, the foregoing data may be received directly by the central controller (e.g., no intermediary controller). All such variations are intended to fall within the spirit and scope of the present disclosure.

Referring generally to FIG. 1, a system for an engine testing facility may include a test cell system 100 having an engine 110 mechanically coupled to an engine dynamometer 120. The engine 110 may be configured to consume a variety of fuel types, such as Diesel No. 2, Commercially available Ultra Low Sulfur Diesel (USLD), natural gas, blended fuels (e.g., such as 0%-100% propane blended, 0%-100% natural gas blended, 0%-60% CO2 blended, biodiesel (B5, B20, or any combination), etc.). A plurality of sensors may be coupled to the engine 110 and/or the dynamometer 120 to provide data regarding the performance of the engine 110 to an engine controller 130. In the example shown, a turbo outlet temperature sensor 132, a fuel flow rate sensor 134, an engine speed sensor 136, and an engine torque sensor 138 are coupled to the engine 110 and/or the dynamometer 120.

According to the example embodiment shown in FIG. 1, the engine controller 130 is communicably coupled to a system controller 140 such that the data regarding the performance of the engine 110 and/or the dynamometer 120 is received by system controller 140. In some implementations, such as non-test cell implementations of the present disclosure, the engine controller 130 may be omitted and the sensors coupled to the engine 110 and/or dynamometer 120 may be communicatively coupled directly to the system controller 140. As shown in FIG. 1, the system controller 140 is further communicably coupled to various other components of the test cell system 100.

Communication between and among the components of the test cell system 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the system controller 140 is communicably coupled to the systems and components in the test cell system 100 of FIG. 1, the system controller 140 is structured to receive/interpret data from one or more of the components of test cell system 100 shown in FIG. 1.

Figure 2A:
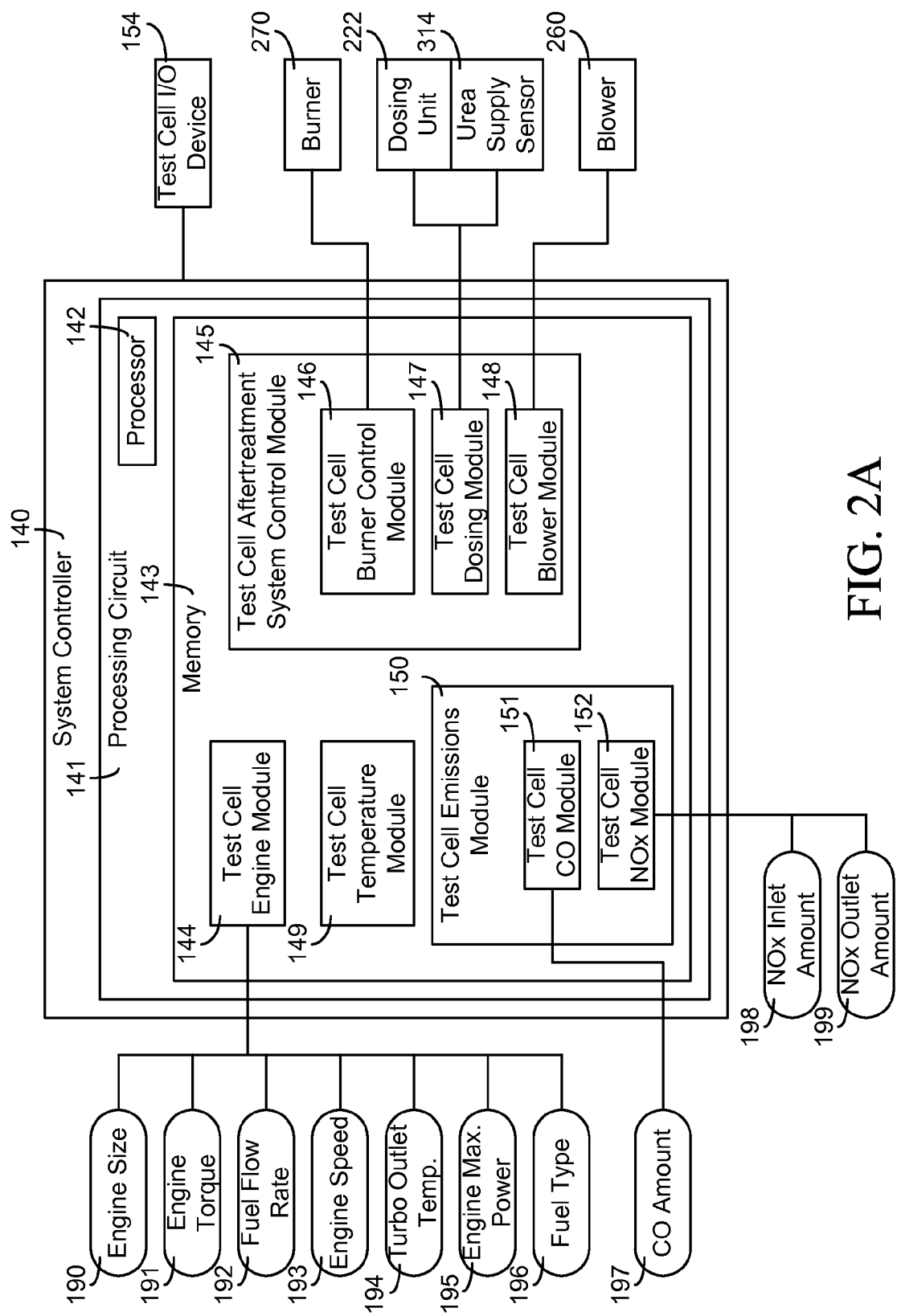
FIG. 2A is a schematic of the controller of FIG. 1.

Referring now to FIG. 2A, the function and structure of the system controller 140 are shown according to one embodiment. The system controller 140 is shown to include a processing circuit 141 including a processor 142 and a memory 143. The processor 142 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 143 (e.g., RAM, ROM, Flash Memory, hard disk storage, etc.) may store data and/or computer code, machine-readable medium, and the like for facilitating various processes described herein. Thus, the one or more memory devices 143 may be communicably connected to the processor 142 and provide computer code or instructions to the processor 142 for executing the processes described in regard to the system controller 140 herein. Moreover, the one or more memory devices 143 may be or include tangible, non-transient volatile memory or non-volatile memory. Accordingly, the one or more memory devices 143 may include database components, object code components, script components, or any other type of information structure for supporting the various activities and information structures described herein.

The memory 143 is shown to include various modules for completing at least some of the activities described herein. More particularly, the memory 143 includes modules configured to selectively adjust one or more operating conditions of the test cell system 100 to control emissions from the test cell system 100. While various modules with particular functionality are shown in FIG. 2A, it should be understood that the system controller 140 and memory 143 may include any number of modules for completing at least some of the functions described herein. For example, the activities of multiple modules may be combined as a single module, as additional modules with additional functionality may be included, etc. Further, it should be understood that the system controller 140 may further control other activity beyond the scope of the present disclosure.

Certain operations of the system controller 140 and central controller 160 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2A, the system controller 140 includes a test cell engine module 144, a test cell aftertreatment system control module 145, a test cell temperature module 149, and a test cell emissions module 150. The test cell engine module 144 is structured to receive the engine/dynamometer data from the engine controller 130. Referring to FIGS. 1-2A, the turbo outlet temperature sensor 132 is coupled to an exhaust outlet 112 of the engine 110 and is structured to output turbo outlet temperature data 194 to the test cell engine module 144 indicative of a temperature of the air or other fluid exiting a turbo of the engine 110. The fuel flow rate sensor 134 is coupled to the engine 110 and is structured to output fuel flow rate data 192 to the test cell engine module 144 indicative of a fuel flow rate into the engine 110 from a fuel source (not shown) or a fuel flow rate within the engine 110. As is described in greater detail herein, the fuel flow rate may be used to determine an amount of fuel consumed by the engine 110 and may be associated with a temperature zone of the exhaust flowing in an aftertreatment system 200 coupled to the exhaust outlet 112 of the engine 110 to determine an emission amount for the engine 110. The test cell temperature module 149 is structured to receive temperature data indicative of a plurality of temperature zones in the aftertreatment system 200. The engine speed sensor 136 is configured to output engine speed data 193 to the test cell engine module 144 indicative of an engine speed of the engine 110 during operation of the engine 110 (e.g., by measuring the rotation rate of a shaft moveable by a crankshaft of the engine 110, etc.). The engine torque sensor 138 is configured to output engine torque data 191 to the test cell engine module 144 indicative of an engine torque of the engine 110 during operation of the engine 110. The engine torque sensor 138 may also be configured to output engine power data to the test cell engine module 144 indicative of an engine power of the engine 110 during operation of the engine 110. Of course, other diagnostic sensor may also be coupled to the engine 110 and/or the engine dynamometer 120 to provide additional or other types of engine/dynamometer data to the test cell engine module 144. In one embodiment, the system controller 140 is communicably coupled to a test cell input/output (I/O) device 154 included with the test cell system 100. The test cell I/O device 154 may allow an operator of test cell system 100 to input further data regarding the engine 110 and/or other components, such as engine size data 190, engine maximum power data 195 (e.g., maximum horsepower, etc.), and/or fuel type data 196 (e.g., diesel, gasoline, natural gas, etc.). Accordingly, the test cell I/O device 154 may include, but is not limited to, a computer, a tablet computer, a phone, a watch, a graphical user interface, a touchscreen device, etc.

Operation of the system controller 140 (and, consequently, central controller 160) may be based, at least partly, on operation of the test cell system 100. Accordingly, to aid explanation of the controllers, referring back to FIG. 1, the engine 110 is supplied with air for combustion via an intake 114 and expels exhaust gases out an exhaust outlet 112. The exhaust outlet 112 is in fluid communication with an aftertreatment system 200 such that exhaust gases produced by the engine 110 may be treated by the aftertreatment system 200.

The aftertreatment system 200 includes a diesel oxidation catalyst 210, a reductant delivery system 220, a decomposition chamber or reactor 230, a SCR catalyst 240, and an exhaust stack 250. In some implementations, the aftertreatment system 200 may also include a diesel particulate filter (DPF) to remove particulate matter, such as soot, from exhaust gas.

The diesel oxidation catalyst 210 is configured to oxidize hydrocarbons and/or CO in the exhaust gas into $CO_2$ and water. The diesel oxidation catalyst 210 is in fluid communication with the exhaust outlet 112 from the engine and the decomposition chamber 230. The reductant delivery system 220 is configured to dose a reductant, such as urea, into the decomposition chamber or reactor 230 to react with $NO_x$ in the exhaust gas. In the implementation shown, the reductant delivery system 220 includes a dosing unit 222 to control the delivery of the reductant to a nozzle 224. Compressed air may be in fluid communication with the nozzle 224 and supplied to assist in vaporizing the reductant for delivery into the decomposition chamber or reactor 230. The decomposition chamber 230 is configured to convert the reductant, such as urea, aqueous ammonia, or diesel exhaust fluid (DEF), into ammonia. In the present example, the urea, aqueous ammonia, or DEF is injected upstream of the SCR catalyst 240. The reductant droplets then undergo the processes of evaporation, thermolysis, and hydrolysis to form gaseous ammonia within the aftertreatment system 200. The decomposition chamber 230 is in fluid communication with the diesel oxidation catalyst 210 to receive the exhaust gas containing $NO_x$ emissions and is in fluid communication with the SCR catalyst 240 for the exhaust gas, $NO_x$ emissions, ammonia, and/or remaining reductant to flow to the SCR catalyst 240.

The SCR catalyst 240 is configured to assist in the reduction of $NO_x$ emissions by accelerating a $NO_x$ reduction process between the ammonia and the $NO_x$ of the exhaust gas into diatomic nitrogen, water, and/or $CO_2$. The SCR catalyst 240 includes an inlet in fluid communication with the decomposition chamber 230 from which exhaust gas and reductant is received and an outlet to the exhaust stack 250. The exhaust stack 250 may be a tubular member extending substantially vertical relative to a ground datum. In some implementations, the exhaust stack 250 may be 70 feet above grade level and may be self-supporting. Of course, other sizes, shapes, and/or configurations for the exhaust stack 250 may be utilized.

Referring back to FIG. 2A, the test cell emissions module 150 is shown to include a test cell CO module 151 and a test cell NOx module 152. However, in other embodiments, the test cell emissions module 150 may also include other and/or different modules specific to various exhaust gas constituents (e.g., a SOx module, a PM module, etc.) depending on the configuration of the system (e.g., to maintain a SOx emissions amount at or below the predetermined threshold). All such variations are intended to fall within the spirit and scope of the present disclosure.

The test cell emissions module 150 is structured to interpret data indicative of an emissions amount from the test cell system 100. The test cell CO module 151 is structured to interpret CO amount data 197 indicative of a CO amount in the exhaust emissions. In one embodiment, the CO amount data 197 is based upon a measurement (e.g., a CO sensor, an exhaust gas analyzer, etc.). In another embodiment, the CO amount 197 is determined and/or estimated using any type of formula, algorithm, and/or a process and may be based upon various other emissions data (e.g., a fuel consumed, a NOx conversion fraction, etc.). The test cell NOx module 152 is structured to interpret NOx inlet amount data 198 and NOx outlet amount data 199 indicative of a $NO_x$ amount in the aftertreatment system 200 (e.g., via NOx sensors 310 and 320). Inlet and outlet $NO_x$ amount data may provide an indication of the $NO_x$ conversion fraction for the system, which may be used by the system controller 140 to diagnose the SCR or other components in the aftertreatment system 200. According to one embodiment, the system controller 140 (and central controller 160) use the outlet NOx data 199 as representative of NOx emissions for the test cell system 100.

As mentioned above, in other embodiments, the emissions amount may include at least one of a PM amount and $SO_x$ amount interpreted by corresponding modules (e.g., a PM module, a SOx module, etc.). In this configuration, PM (e.g., soot and ash) may be measured, determined, and/or estimated. For example, a PM amount may be estimated based upon a reduction in exhaust gas flow through the aftertreatment system 200. In another configuration, a $SO_x$ amount may be measured, determined, and/or estimated. For example, the $SO_x$ may be determined using a lookup table that includes estimates of $SO_x$ based on a fuel type, an engine type (e.g., power output), and an aftertreatment system configuration. In other embodiments, $SO_x$ and PM amounts may be determined using any known method or process.

In one embodiment, the test cell engine module 144 is structured to deactivate the test cell system 100 based on the comparison of the emissions amount to a deactivation value or range for either the test cell system 100 individually or the facility as a whole (described in greater detail below). In another embodiment, the test cell engine module 144 is structured to selectively control operation of the engine 110 in the test cell system 100 based on the comparison of the emissions amount to the predetermined threshold (for example, in regard to an adjustment value or range). In certain embodiments, the test cell aftertreatment system control module 145 and the test cell engine module 144 are structured to cooperatively adjust the emissions amount for the test cell system 100 by selectively controlling a component in the aftertreatment system 200 and the engine 110 (e.g., reduce engine speed and increase blower speed to reduce exhaust gas temperatures and reduce a NOx emissions amount).

The test cell aftertreatment system control module 145 is structured to control one or more components of the aftertreatment system 200 based on the emission amount of the test cell system 100 via a test cell burner control module 146, a test cell dosing module 147, and/or a test cell blower module 148. As shown in FIG. 1, the aftertreatment system 200 of the present example further includes a blower skid 260 and a burner 270 in fluid communication with the exhaust outlet 112. In one embodiment, the test cell blower module 148 is structured to control the operation of the blower skid 260. The blower skid 260 may include a fan, a pump, or other fluid moving device to provide additional air to the exhaust gas and/or increase the pressure of the exhaust gas within the aftertreatment system 200. The burner 270 may be coupled to a natural gas source and may be configured to combust the supplied natural gas to increase the temperature of the exhaust gas in the aftertreatment system 200. In one embodiment, the test cell burner control module 146 is structured to control the operation (e.g., activation, deactivation, etc.) of the burner 270. When the burner 270 is activated, any air supplied by the blower skid 260 may be heated and provided into the exhaust outlet 112 to increase the temperature of the exhaust gas. If the burner 270 is not activated, then any air supplied by the blower skid 260 may be provided into the exhaust outlet 112 to decrease the temperature of the exhaust gas. In some embodiments, the test cell temperature module 149 interprets exhaust temperature data such that the test cell aftertreatment system control module 145 selectively controls the temperature of the exhaust to affect a desired emissions amount. In some implementations, the burner 270 may also be activated independent of the blower skid 260 to heat the exhaust gas. Operating conditions of the blower skid 260, the burner 270, and the reductant delivery system 220 may be modified to adjust the efficiency of the aftertreatment system 200 (i.e., adjusting the emission levels, etc.) by increasing or decreasing a temperature of the exhaust gas, increasing or decreasing a pressure of the exhaust gas, and/or increasing or decreasing an amount of ammonia within the aftertreatment system 200 that is available to react with the $NO_x$ emissions.

In the present example, the aftertreatment system 200 is mounted on a roof of a facility, though it should be understood that aftertreatment system 200 may be adjacent a facility, underground, and/or remote from a facility. Moreover, in some implementations, the engine 110 and aftertreatment system 200 may be independent of a facility (e.g., the engine and aftertreatment unit may be mounted to a trailer or positioned outside). In some implementations, the aftertreatment system 200 may be constructed as a complete system that is rigged for lifting as one assembly onto the roof of the facility.

The aftertreatment system 200 of the present example includes several sensors configured to provide data to the system controller 140. In the example shown, an air flow sensor 300 is in fluid communication with the intake 114 and is configured to measure an air flow of inlet air to the engine 110. A natural gas flow sensor 302 is coupled to the natural gas supply for the burner 270 and is configured to measure the flow of natural gas to the burner 270. A first aftertreatment temperature sensor 304 is coupled to the exhaust outlet 112 upstream of the burner 270 and is configured to measure the temperature of the exhaust gas prior to any heating and/or cooling provided by the burner 270 and/or blower skid 260. A second aftertreatment temperature sensor 306 is coupled to the exhaust outlet 112 downstream of the burner 270 and is configured to measure the temperature of the exhaust gas after any heating and/or cooling provided by the burner 270 and/or blower skid 260. A pressure sensor 308 is coupled to the exhaust outlet 112 downstream of the burner 270 and is configured to measure the pressure of the exhaust gas after the exhaust gas has passed the burner 270 and/or blower skid 260.

A first aftertreatment $NO_x$ sensor 310 is coupled to an upstream portion of the decomposition chamber 230 and is configured to measure an amount of $NO_x$ emissions within the decomposition chamber 230 downstream of the diesel oxidation catalyst 210. A third aftertreatment temperature sensor 312 is coupled to the upstream portion of the decomposition chamber 230 and is configured to measure the temperature of the exhaust gas after the diesel oxidation catalyst 210. A urea supply sensor 314 is coupled to a fluid line from the dosing control unit 222 to the nozzle 224 and is configured to measure a flow rate of urea or another reactant to the nozzle 224. Based on the emissions amount determined by the test cell emission module 150, the test cell dosing module 147 may increase or decrease the reductant dosing to affect a desired emissions amount. A compressed air flow rate sensor 316 is coupled to the nozzle 224 and is configured to measure a flow rate of compressed air through the nozzle 224. A fourth aftertreatment temperature sensor 318 is coupled to the exhaust stack 250 and is configured to measure the temperature of the exhaust gas after the SCR catalyst 240. A second aftertreatment $NO_x$ sensor 320 is coupled to the exhaust stack 250 and is configured to measure an amount of $NO_x$ emissions in the exhaust gas exiting through the exhaust stack 250 and downstream of the SCR catalyst 240. In some implementations, additional sensors may be included to monitor the diesel oxidation catalyst 210 temperature and the SCR catalyst 240 temperature, and/or differential pressures across various portions the aftertreatment system 200.

The air flow sensor 300, the natural gas flow sensor 302, the first aftertreatment temperature sensor 304, the second aftertreatment temperature sensor 306, the pressure sensor 308, the first aftertreatment NOx sensor 310, the third aftertreatment temperature sensor 312, the urea supply sensor 314, the compressed air flow rate sensor 316, the fourth aftertreatment temperature sensor 318, and the second aftertreatment NOx sensor 320 are communicatively coupled to the system controller 140 to provide data indicative of the various conditions sensed by the sensors. As noted above, in some implementations the sensors are communicatively coupled to the engine controller 130 may be directly communicatively coupled to the system controller 140 (e.g., in an implementation where the engine 110, aftertreatment system 200, and the system controller 140 are deployed at an end-user facility and/or otherwise used separate from a test cell). In still further implementations, the engine controller 130 may be integrated into the system controller 140 to form a single controller.

As mentioned above, the test cell aftertreatment system control module 145 is configured to control the burner 270 (e.g., by controlling a flow rate of natural gas to the burner 270, etc.), the blower skid 260, and/or the reductant delivery system 220. In some embodiments, the test cell aftertreatment system control module 145 may be configured to automatically control the burner 270, blower skid 260, and/or the reductant delivery system 220 to modify an efficiency of the aftertreatment system 200 responsive to a comparison of the emissions amount to the predetermined threshold.

The test cell engine module 144 is further structured to determine a total amount of fuel consumed for each temperature zone of a plurality of temperature zones. That is, the system controller 140 may have bucketized temperature zones (e.g., <200° F., 200° F. to <300° F., 300° F. to <350° F., 350° F. to <400° F., 400° F. to <425° F., 425° F. to <450° F., 450° F. to <475° F., 475° F. to <500° F., 500° F. to <525° F., 525° F. to <550° F., 550° F. to <575° F., 575° F. to <600° F., 600° F. to <625° F., 625° F. to <650° F., 650° F. to <675° F., 675° F. to <700° F., 700° F. to <725° F., 725° F. to <750° F., 750° F. to <775° F., 775° F. to <800° F., 800° F. to <825° F., 825° F. to <850° F., 850° F. to <875° F., 875° F. to <900° F., 900° F. to <925° F., 925° F. to <950° F., 950° F. to <975° F., 975° F. to <1000° F., 1000° F. to <1025° F., 1025° F. to <1050° F., 1050° F. to <1075° F., 1075° F. to <1100° F., 1100° F. to <1125° F., 1125° F. to <1150° F., 1150° F. to <1175° F., 1175° F. to <1200° F., and >1200° F.) and may be configured to aggregate the fuel consumption by the engine 110 while the aftertreatment system 200 is within a corresponding temperature zone bucket. In some implementations, the temperature zones may be determined based on a temperature of one of the temperature sensors, a temperature of the diesel oxidation catalyst 210, a temperature of the SCR catalyst 240, a temperature of the exhaust gas at the outlet of the engine 110, and/or an average of one or more of the foregoing temperatures. As is described in greater detail below, the aggregated fuel consumption in the temperature zones may be used to calculate the $NO_x$ and/or CO emission levels for the operation of the engine 110 by determining the discretized $NO_x$ and/or CO emission level for each temperature zone based on the fuel consumption for that temperature zone and then aggregating the discretized $NO_x$ and/or CO emission levels for a total $NO_x$ and/or CO emission level for the engine 110.

The system controller 140 is further communicatively coupled to a central controller 160. In the present example, a single system controller 140 is shown communicatively coupled to the central controller 160, though it should be understood that several system controllers 140 for several test cell systems 100, engines 110, and aftertreatment systems 200 may be communicatively coupled to the central controller 160. Thus, the central controller 160 may receive data from several test cell systems 100, engines 110, aftertreatment systems 200, and/or system controllers 140. Accordingly, the central controller 160 provides for a technologically advanced system for a facility by communicably coupling each test cell system 100 and providing independent control of each test cell system 100 relative to other test cell systems 100 to maintain/control a total emissions amount from the facility.

Communication between and among the central controller 160 and the one or more system controllers 140 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the central controller 160 is communicably coupled to the system controllers 140, the central controller 160 is structured to receive data from one or more modules of the system controllers 140.

Figure 2B:
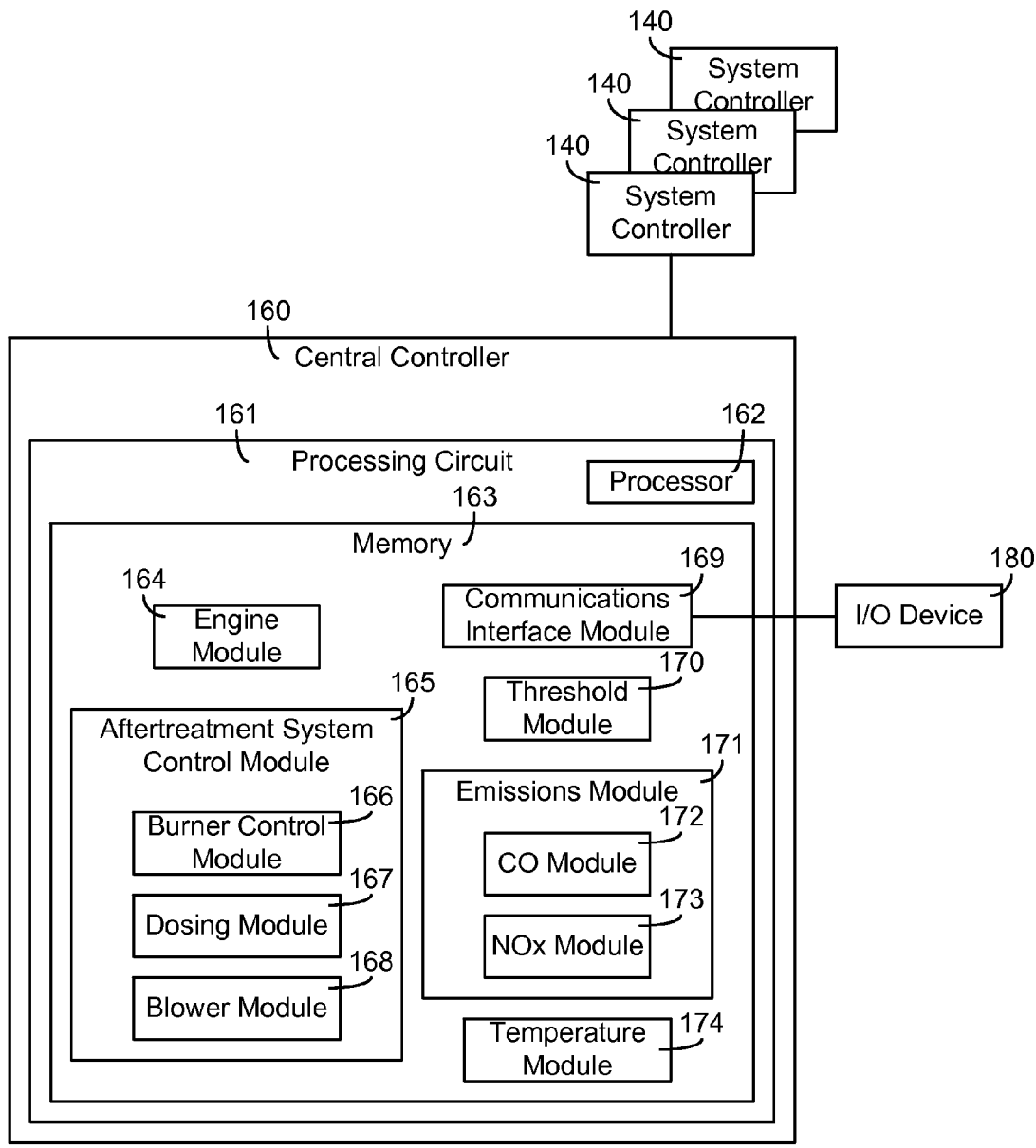
FIG. 2B is a schematic of the central controller of FIG. 1.

Referring now to FIG. 2B, the function and structure of the central controller 160 are shown according to one embodiment. The central controller 160 is shown to include a processing circuit 161 including a processor 162 and a memory 163. The processor 162 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 163 (e.g., RAM, ROM, Flash Memory, hard disk storage, etc.) may store data and/or computer code for facilitating the various processes described herein. Thus, the one or more memory devices 163 may be communicably connected to the processor 162 and provide computer code or instructions to the processor 162 for executing the processes described in regard to the central controller 160 herein. Moreover, the one or more memory devices 163 may be or include tangible, non-transient volatile memory or non-volatile memory. Accordingly, the one or more memory devices 163 may include database components, object code components, script components, or any other type of information structure for supporting the various activities and information structures described herein.

The memory 163 is shown to include various modules for completing various activities described herein. More particularly, the memory 163 includes modules structured to selectively adjust one or more operating conditions of one or more of test cell systems 100 to control emissions from one or more test cell systems 100 and the facility as a whole. While various modules with particular functionality are shown in FIG. 2B, it should be understood that the central controller 160 and memory 163 may include any number of modules for completing the functions described herein. For example, the activities of multiple modules may be combined as a single module, as additional modules with additional functionality may be included, etc. Further, it should be understood that the central controller 160 may further control other activity beyond the scope of the present disclosure.

As shown in FIG. 2B, the central controller 160 includes an engine module 164, an aftertreatment system control module 165, a communications interface module 169, an emissions threshold module 170, an emissions module 171, and a temperature module 174. The central controller 160 is configured to receive data indicative of a status of the test cell system 100, a plurality of amounts of fuel consumed by the engine 110 for a plurality of temperature zones in one or more test cell systems 100, and other data (e.g., an emissions amount from each test cell system) from the system controller 140.

The engine module 164 is structured to interpret the various data (e.g., engine size data 190, engine torque data 191, fuel flow rate data 192, etc.) gathered by various test cell engine modules 144. The CO module 172 and the NOx module 173 of the emissions module 171 are configured to interpret the emissions amounts gathered by the test cell CO module 151 and the test cell NOx module 152 of the test cell emissions module 150 for at least one test cell system 100. As mentioned above, in other embodiments, the test cell systems 100 may monitor other exhaust emissions amount (e.g., SOx, PM, etc.). In those configurations, the central controller 160 may be structured to interpret SOx and/or PM data from those test cell systems. The temperature module 174 is structured to receive temperature data indicative of the plurality of temperature zones in the aftertreatment systems 200.

The emissions module 171 is further structured to determine a total emissions amount for the facility based, at least in part, on the received plurality of amounts of fuel consumed for the plurality of temperature zones. That is, the emissions module 171 is configured to utilize a fuel consumption amount (e.g., gallons of fuel, etc.) and a temperature zone in which the fuel consumption occurred to determine an amount of $NO_x$ and/or CO emission level generated by the engine 110 for that consumption of fuel for each test cell system 100. The emission level generated by the engine 110 may be determined using a temperature zone efficiency curve or a temperature zone efficiency table. According to another embodiment, the emissions module 171 may be structured to simply aggregate the CO, $NO_x$, PM, and/or $SO_x$ amounts for each test cell system 100 independent of the fuel consumption and compare at least one of those aggregate or individual amounts to the predetermined threshold (described below).

The discretized $NO_x$ and/or CO emission level for each temperature zone for the engine 110 may be aggregated to determine a total $NO_x$ and/or CO emission amount for the engine 110 (and, consequently, for a facility). Thus, for a plurality of engines 110, the emissions module 171 may simply receive the total amount of fuel consumed by each engine 110 for each temperature zone, aggregate the total fuel consumption for each temperature zone, then calculate the total emission amount for that temperature zone. The discretized total emission amounts for each temperature zone may then be aggregated to determine a total emission amount for the plurality of engines 110.

The emissions threshold module 170 is structured to aggregate the emissions amount from each test cell system 100 in the facility to determine a total emissions amount for the facility and compare the total emissions amount to a predetermined threshold for the facility. The predetermined threshold may be based on at least one of a federal, state, and local regulation prescribing at least one of an allowable emissions amount and a regulated amount. A regulated amount refers to an emissions amount set by a federal, state, or local regulation. A regulated amount may include a certain emissions amount over a period of time and/or a not-to-exceed limit. The not-to-exceed limit prescribes an emissions amount that may never be exceeded (even if in a transient occurrence). For example, a local ordinance may set a not-to-exceed limit of 10 lbs. CO/hour. In comparison, the certain regulated emissions amount may be an average or other representative value, wherein at transient times, the emissions may exceed that amount. For example, the regulated amount may be an average of 25 lbs. NOx/day, such that at certain periods of time the exhaust emissions is projected at 35 lbs./day while at other instances the projection is 5 lbs./day. However, in total, the average NOx emissions for the day is at or below the predetermined regulated threshold of 25 lbs. NOx/day. In comparison, an allowable emissions amount refers to an offset introduced to the regulated amount by an owner, operator, and/or user of the facility and/or test cell system. For example, an allowable emissions rate may be ten percent less than the regulated amount (e.g., if a local ordinance prescribes 10 lbs. CO/day, the allowable amount may be 9 lbs. CO/day). In this regard, the buffer (i.e., the ten percent offset) is utilized to substantially ensure that the emissions amount does not exceed the predetermined allowable emissions threshold.

In certain embodiments, as briefly mentioned above, the predetermined threshold may include one or more additional values or ranges for one or more exhaust emissions amounts that trigger one or more different operations from at least one of the central controller 160 and the system controller 140. For example, the central controller 160 may be structured to provide an alert based on the total emissions amount being within an alert value or range (e.g., plus-or-minus 5% of a CO amount alert limit). Whenever the total emissions amount is within the alert value range, the central controller 160 may report out an alert to an input/output device (e.g., to alert an operator of the facility, such as a graphical indication of: "CO emissions for the facility are currently at an alert value."). The alert value or alert range may correspond with an emissions amount that, if continued, an allowable and/or regulated emissions amount would be or likely be surpassed. In still another example, the central controller 160 is structured to increase an efficiency of an aftertreatment system associated with the test cell system based on the total emissions amount being at or within an adjustment value or range. The adjustment value range may refer to a range of emissions amount (e.g., 30 lbs. NOx to 50 lbs. NOx/month), where if the determined emissions amount falls within the range, the central controller 160 provides a command to adjust operation of the aftertreatment system 200 or engine 110 (e.g., increase blower output to lower exhaust temperatures and, consequently, NOx emissions). In another example, the central controller 160 may be structured to deactivate at least one test cell systems 100 based on an emissions amount being at or above a deactivation value or range. For example, if a test cell system 100 is emitting 5 lbs. NOx/hour and the facility is with 5 lbs. of its daily limit, the central controller 160 may simply deactivate that test cell system. In this situation, the central controller 160 recognizes that the total emissions amount is at or near an allowable or regulated emission amount, such that the most efficient process to maintaining the total emissions at or below the regulated and/or allowable amount is to deactivate at least one test cell system 100. In this case, the central controller 160 may provide a command to a test cell engine module 144 to deactivate the engine 110 in the test cell system 100 and controllably shut the test cell system 100 down.

In one embodiment, the deactivation value or range is greater than the adjustment value or range, which is greater than the alert value. Because a complete deactivation would immediately lower the total emissions amount from the facility, deactivation may be used as a "last resort" of sorts while the adjustment and/or alert value or ranges are used to trigger corrective action or warn of an impending event. It should be understood that while the aforementioned is discussion was primarily in regard to an amount of a single exhaust emissions constituent (e.g., 5 lbs. CO, etc.), the alert, deactivation, and/or adjustment values may be based on a combination of one or more exhaust emissions amount (e.g., a CO and a SOx amount, only a NOx amount, a SOx and a NOx amount, etc.). Accordingly, the predetermined threshold and, consequently, the alert, adjustment, and deactivation values may be highly configurable and incorporate a wide array of values.

In one embodiment, the emissions threshold module 170 is further structured to interpret the emissions amounts of the engines 110 determined by the emissions module 171 individually (e.g., per engine 110, etc.) and/or cumulatively (e.g., the emissions amount of an entire facility, etc.). The total emission amount for the plurality of engines 110 may then be compared to a predetermined threshold, such as a 12 month rolling average, such that the emissions from the plurality of engines 110 may be monitored by the central controller 160 instead of monitoring each individual system controller 140 and/or each individual engine 110. As mentioned above, the predetermined threshold may be based on at least one of a federal, state, and local regulation prescribing at least one of an allowable emissions amount and a regulated amount. In one embodiment, a higher emissions amount is permissible (relative to the regulated amount), but may result in fee (e.g., penalty, etc.).

In some implementations, the emissions module 171 may be configured to output a value indicative of the total emission amount for the facility (or, in some embodiments, one or more of the plurality of engines, etc.). For example, the output value may be a value to trigger an alarm indicating that the present calculated total emission amount exceeds the predetermined threshold and corrective action (e.g., increasing efficiency of one or more of the aftertreatment systems 200, etc.) may need to occur. In one embodiment, the communications interface module 169 issues the alarm via an input/output device 180 such that an operator may take corrective action (e.g., deactivate a test cell system 100, etc.). Accordingly, the input/output device 180 may include any type of communications device including, but not limited to, a computer, a tablet computer, a phone, a touchscreen device, etc. In other embodiments, the communications interface module 169 directly communicates data to one or more test cell systems 100 regarding the alarm to automatically take corrective action. In some further implementations, a second alarm may be triggered if the total emission amount exceeds a second predetermined threshold, indicating that one or more of the test cell systems 100 may need to be deactivated to remain below a set limit (e.g., a permitted limit, etc.).

For example, some criteria uses 3 hours of stack testing to determine a worse-case efficiency for the SCR catalyst 240 and diesel oxidation catalyst 210 per temperature zone. The testing may reflect an emissions factor based on fuel burned for CO and for NOx. These emission factors (e.g., lbs. of NOx/gal fuel consumed, lbs. of NOx, lbs. of CO, lbs. of SOx, lbs. of PM, etc.) may be used to calculate a facility's emissions for a 12 month rolling average. Further, these amounts may correspond with not-to-exceed limits and other emissions regulations for the facility and/or test cell system 100 individually.

The aftertreatment system control module 165 may be configured to output data via the communications interface module 169 to a system controller 140 to cause the system controller 140 to increase an efficiency of the aftertreatment system 200 associated with the system controller 140. That is, the aftertreatment system control module 165 may be structured to dynamically manage one or more test cell systems 100 to ensure that the overall facility does not exceed the limit for the facility (e.g., a permitted limit for the facility). The dynamic management of the test cell systems 100 may include increasing the efficiency of one or more aftertreatment systems 200 via modifying an operational parameter of a burner 270 with the burner control module 166, a blower skid 260 with the blower module 168, and/or a reductant delivery system 220 with the dosing module 167.

In one embodiment, the dynamic management may include the engine module 164 deactivating one or more the test cell systems 100 (e.g., by performing a controlled shut down of the engine 110, etc.) based on the comparison of the emissions amount to the predetermined threshold being at or above the deactivation value. In another embodiment, the engine module 164 is structured to selectively control operation of one or more engines 110 based on the comparison of the emissions amount to the predetermined threshold. In a further embodiment, the aftertreatment system control module 165 and the engine module 164 are structured to cooperatively adjust the emissions amount for a plurality of test cell systems 100 by selectively controlling both a component in each aftertreatment system 200 and engines 110. In still another embodiment, the engine module 164 and the aftertreatment system control module 165 are structured to control each test cell system 100 independently in the facility, such that each test cell system 100 corresponds with a different emissions amount relative to each other test cell system 100, but the total emissions amount for the facility is at or below the predetermined threshold.

In still further instances, the central controller 160 may be structured to generate reporting information (e.g., a total emission amount for the plurality of test cell systems 100, a total emission amount for each test cell system 100, and/or other operational data received from the system controllers 140, etc.) to generate a report for the facility (e.g., to comply with any reporting requirement, etc.). In one embodiment, the communications interface module 169 is structured to output a value indicative of the comparison of the total emissions amount to the predetermined threshold to the input/output device 180.

In some other implementations, the system controllers 140 may each calculate a total $NO_x$, $SO_x$, PM, or CO emission amount for the test cell system 100 and the system controllers 140 may simply provide data indicative of the total $NO_x$, $SO_x$, PM, or CO emission amount for the test cell system 100 to central controller 160 such that the emissions module 171 merely aggregates the total $NO_x$, $SO_x$, PM, and/or CO emission amount for the plurality of test cell systems 100. In this case, the predetermined threshold may be in regards to at least one of a total $NO_x$, CO, PM, and SOx emission amount for the test cell system 100. In another configuration, the predetermined threshold may be in regards to at least one of a total $NO_x$, CO, PM, and SOx emission amount for the plurality of test cell systems 100 (e.g., the entire system that makes up the facility, etc.). Thus, the predetermined threshold (e.g., a regulated amount, an allowable amount, etc.) may be based on a total amount of NOx from an individual test cell, a total amount of CO from an individual test cell, a total amount of NOx from the system of test cells, a total amount of CO from the system of test cells, a total amount of PM for an individual test cell system, a total amount of PM for the system of test cells, a total amount of SOx for an individual test cell system, a total amount of SOx for the system of test cells, and/or a combination therewith (e.g., a total amount of NOx and CO from the system of test cells, etc.), and so on. As described herein, the predetermined threshold may be based on a temporal aspect (e.g., a total amount of NOx, SOx, PM, or CO for the past twelve months, past three years, etc.).

In some implementations, the aftertreatment system 200 for $NO_x$ efficiency may be at least 5% (e.g., a predefined buffer, etc.) above a minimum required efficiency per temperature zone to maintain compliance for each individual test cell system 100 (and/or a system as a whole that includes a plurality of engines or test cells). In some implementations, the aftertreatment system 200 for $NO_x$ may be configured to not emit more than 11 tons of $NO_x$ per test cell system 100 per year (e.g., a predetermined threshold, etc.). In some implementations, the aftertreatment system 200 for CO efficiency may have an overall rating of 70% while the test cell system 100 is in operation. In some implementations, the aftertreatment system 200 for CO may be configured to not emit more than 11 tons of CO per test cell system 100 per year (e.g., another predetermined threshold, etc.). It should be understood that similar thresholds may be used with a plurality of engines 110 and/or test cell systems 100 for implementation within a facility environment.

As discussed above, the central controller 160 may be configured to control the $NO_x$ and CO emissions with the capability of reporting aggregated information (either per test cell system 100 and/or facility-wide) regarding the $NO_x$ and/or CO emissions. In some implementations, if the data for a test cell system 100 is indicative of the test cell system 100 exceeding a permitted $NO_x$ and/or CO emission level for the test cell system 100, then the central controller 160 may output a not ready signal to the system controller 140 for the corresponding test cell system 100. If the data for a test cell system 100 is indicative of the test cell system 100 not exceeding a permitted $NO_x$ and/or CO emission level for the test cell system 100, then the central controller 160 may output a ready to run signal to the system controller 140 for the corresponding test cell system 100.

In some implementations, the central controller 160 and system controllers 140 may monitor the $NO_x$, PM, $SO_x$, and/or CO emissions per test cell system 100 on a periodic basis (e.g., weekly, daily, monthly, quarterly, etc.). In other implementations, the central controller 160 and system controllers 140 may monitor the $NO_x$, PM, $SO_x$, and/or CO emissions per test cell system 100 substantially continuously such that the response rate for the engine 110 and/or the aftertreatment system 200 may control $NO_x$, PM, $SO_x$, and/or CO emissions during a transient emissions event of varying temperature.

The emissions module 171 may be configured to monitor and report on the $NO_x$, PM, $SO_x$, and/or CO emission levels before and after the aftertreatment system 200 of a test cell system 100. The temperature module 174 may be further structured to monitor and report on the temperature of the diesel oxidation catalyst 210 temperature, the SCR catalyst 240 temperature, and/or differential pressures across various portions of the aftertreatment system 200. The central controller 160 may also be further structured to monitor total fuel usage per temperature zone for the $NO_x$, PM, $SO_x$, and/or CO emission factors set based on a 3 hour stack test that is temperature dependent. The engine module 164 may aggregate the fuel burned during a determined control temperature range and apply the applicable emission factor to the fuel burned to monitor the facility emissions in a 12 month rolling average.

In some implementations, the central controller 160 and/or the system controllers 140 may be configured to log the daily, weekly, monthly, and/or yearly (or other time frame) accumulation of fuel burned with projected levels of $NO_x$, PM, $SO_x$, and/or CO per an emission factor related to fuel burned for 5 years.

While the foregoing example is described in reference to a test cell system 100, it should be understood that the central controller 160 and the system controller 140 and/or plurality of system controllers 140 may be utilized with other systems, such as power generation systems utilizing engines 110 to generate power via a power generation unit (e.g., a generator). For example, the central controller 160 and the system controller 140 and/or a plurality of system controllers 140 may be used with a power generation system for a mining operation to monitor the emissions from the power generation system and/or to dynamically manage system controllers 140 to maintain the emissions from the power generation system below a permitted level. Of course other systems may utilize central controller 160 and/or system controllers 140 as well.

Figure 3:
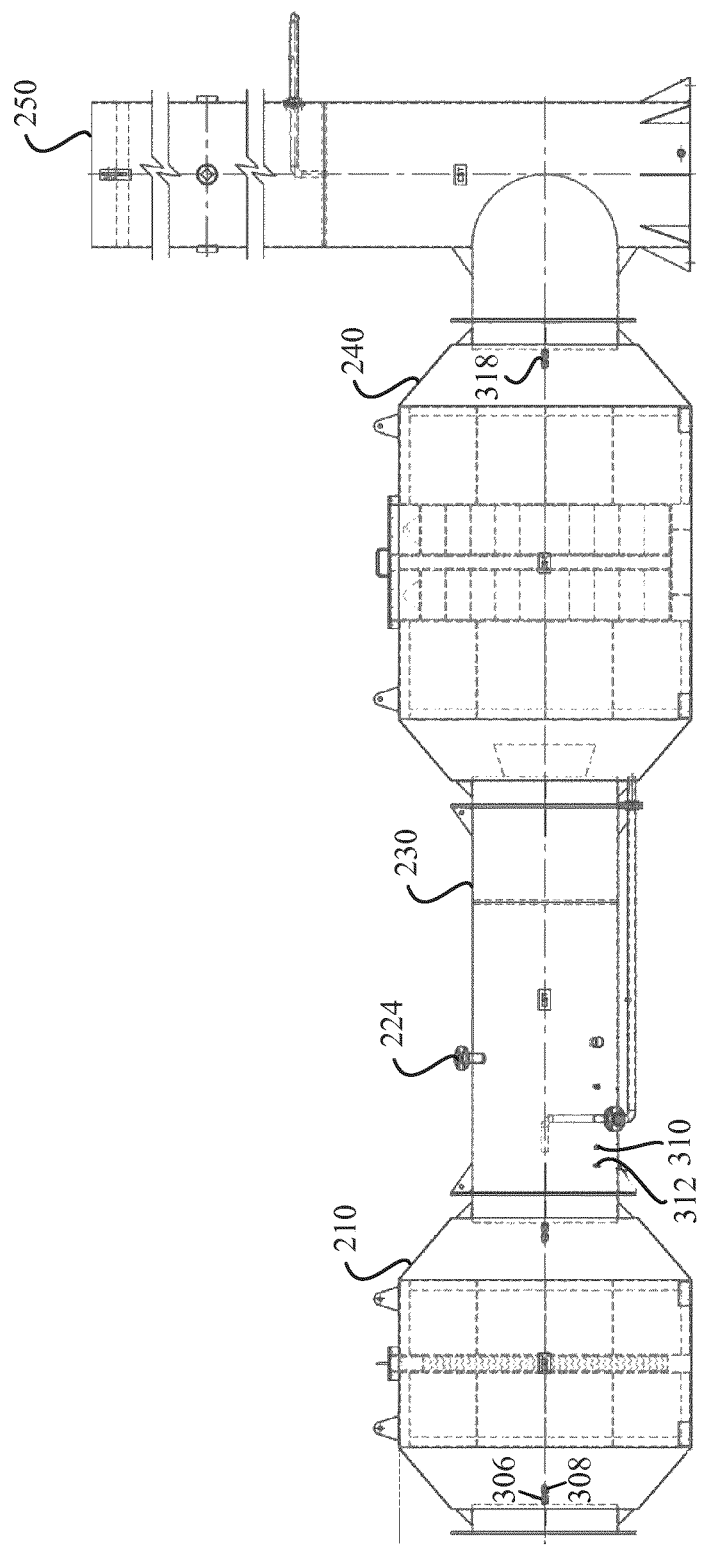
FIG. 3 depicts a side elevation view of a portion of an example aftertreatment system.

FIG. 3 depicts a side elevation view of a portion of the aftertreatment system 200 showing the diesel oxidation catalyst 210, the decomposition chamber 230, SCR catalyst 240, and the exhaust stack 250.

Figure 4:
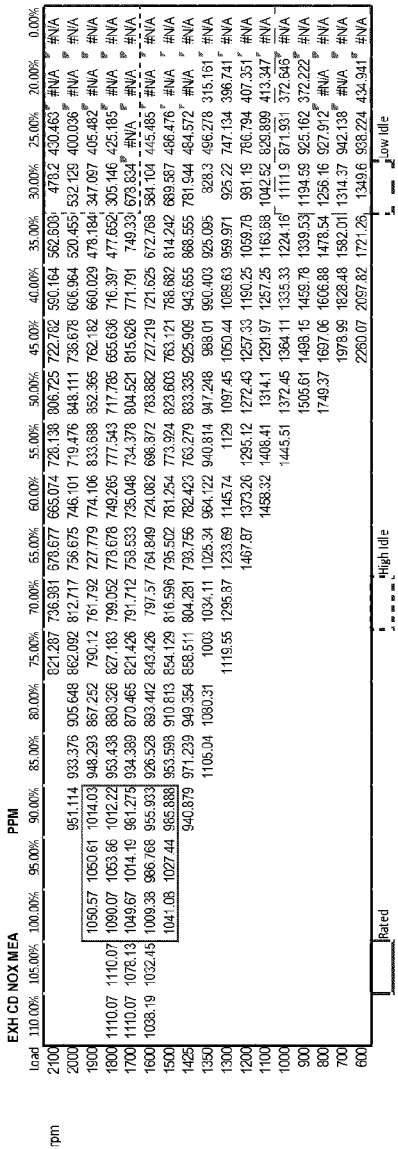
FIG. 4 depicts $NO_x$ concentrations for diesel fuel at the inlet of the aftertreatment system, which may vary up to plus or minus 15% based on humidity levels.
Figure 5:
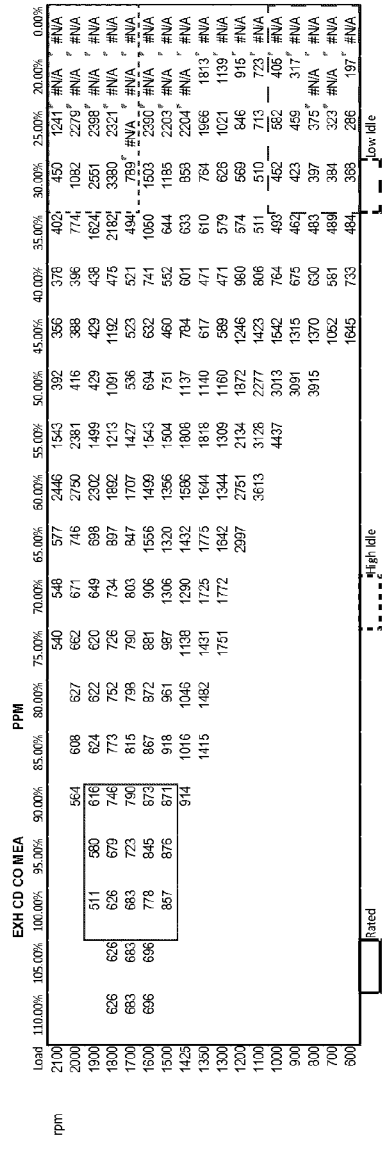
FIG. 5 depicts CO concentrations for diesel fuel at the inlet of the aftertreatment system.
Figure 6:
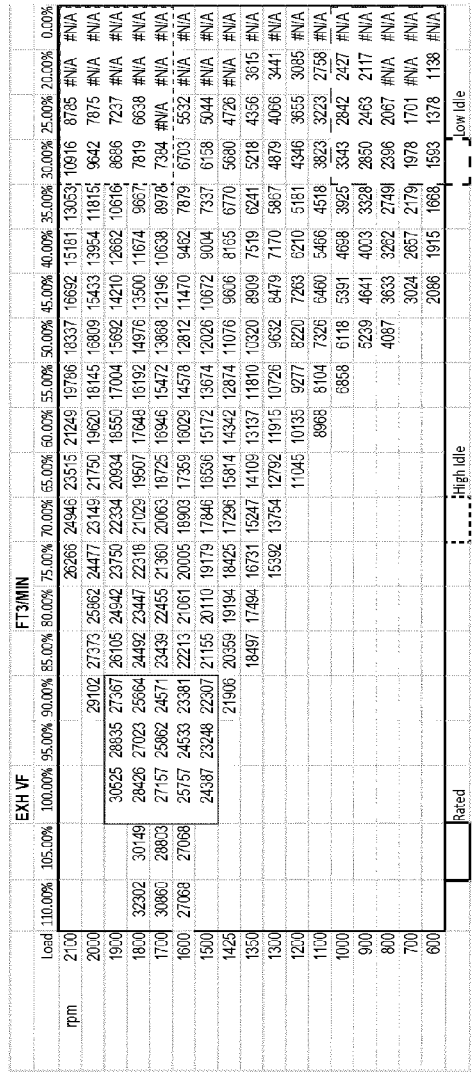
FIG. 6 depicts the largest flow rates through the aftertreatment system in ACFM.
Figure 7:
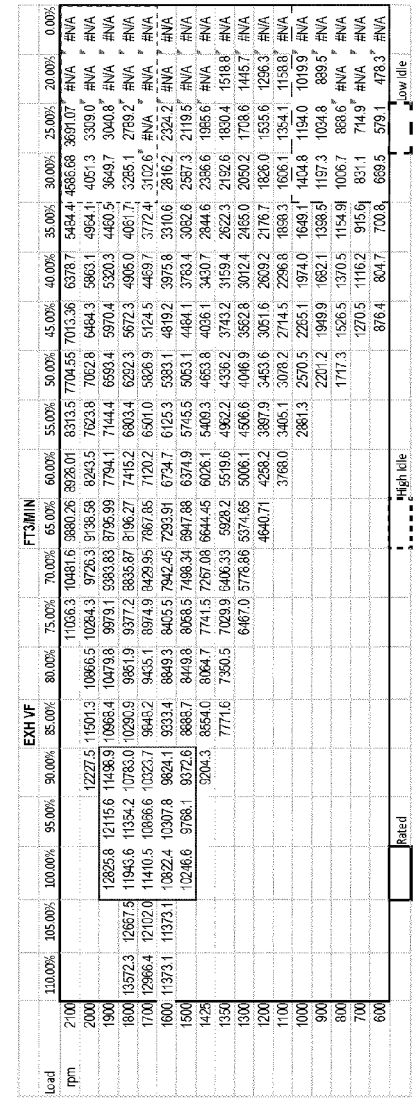
FIG. 7 depicts the lowest flow rates through the aftertreatment system in ACFM.
Figure 8:
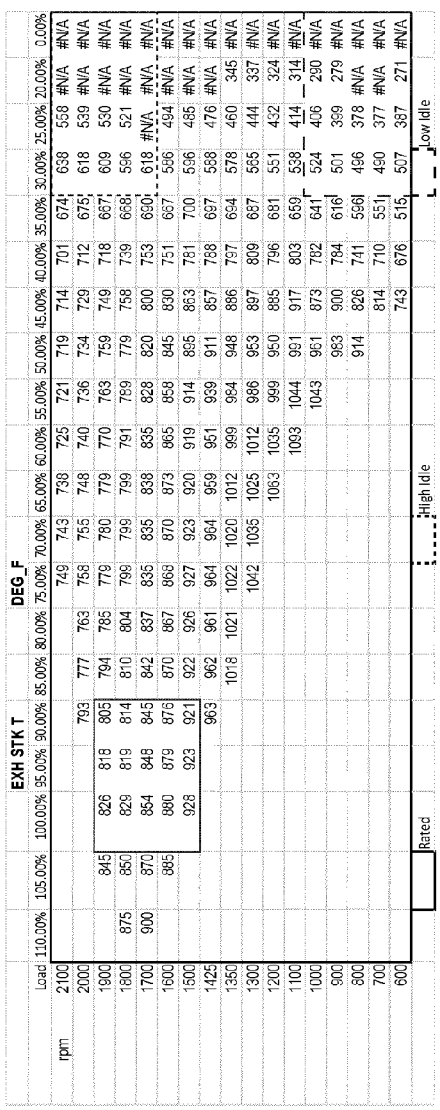
FIG. 8 depicts engine exhaust outlet temperatures.
Figure 10:
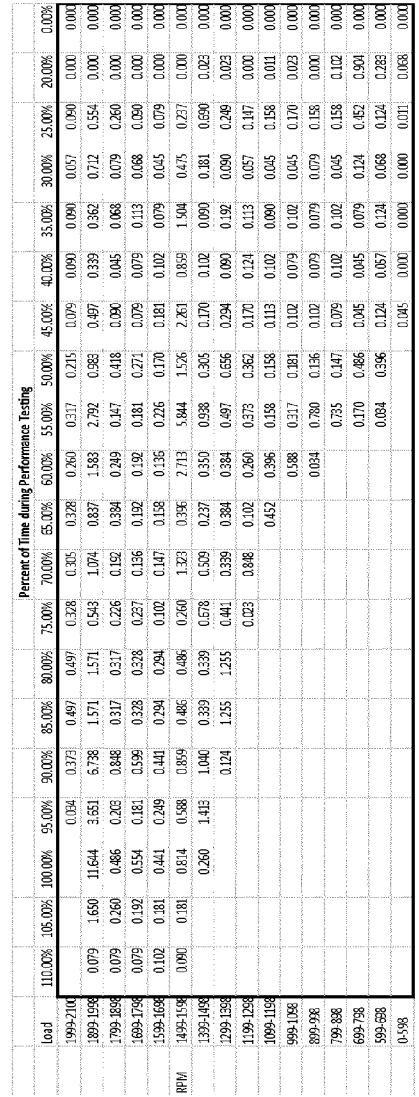
FIG. 10 depicts an area of operation and the percentage of time operating in the area of operation for an average performance test.
Figure 9:
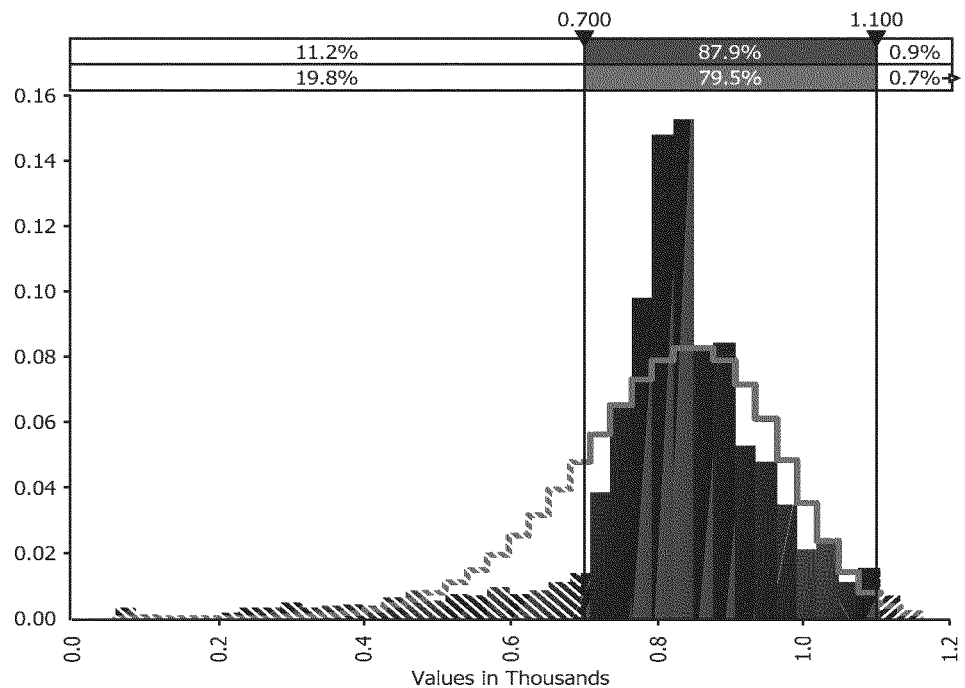
FIG. 9 depicts a temperature distribution for an average performance test.
Figure 11:
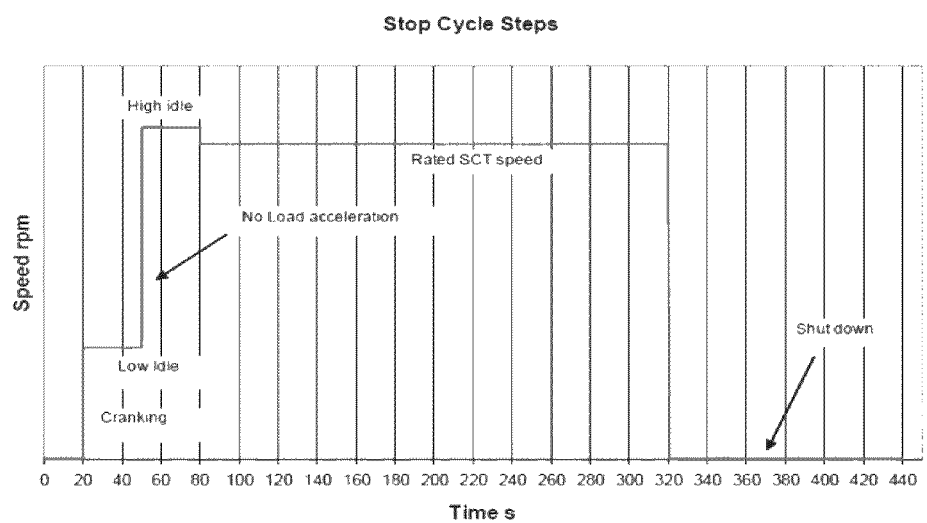
FIG. 11 depicts a typical duty cycle for a mechanical development test cell system.

For some engines 110, conditions when using diesel fuel are shown in FIGS. 4-11. FIG. 4 depicts $NO_x$ concentrations for diesel fuel at the inlet of the aftertreatment system 200, which may vary up to plus or minus 15% based on humidity levels. FIG. 5 depicts CO concentrations for diesel fuel at the inlet of the aftertreatment system 200. FIG. 6 depicts the largest flow rates through the aftertreatment system 200 in actual-cubic-feet-per-minute (ACFM). FIG. 7 depicts the lowest flow rates through the aftertreatment system 200 in ACFM. FIG. 8 depicts engine exhaust outlet 112 temperatures. FIG. 9 depicts a temperature distribution for an average performance test. FIG. 10 depicts an area of operation and the percentage of time operating in the area of operation for an average performance test. In some instances, performance test cell systems 100 may have a 40% utilization per year. FIG. 11 depicts a typical duty cycle for a mechanical development test cell system 100. In some instances, mechanical development test cell systems 100 may have a 60% utilization per year. By dynamically controlling the emissions of a plurality of engines (as described above), the central controller 160 is structured to permit each engine 110 in the plurality of engines to selectively operate at relatively higher power outputs than if the central controller 160 was not provided with the functionality as described above. During high power outputs, the engine 110 tends to produce relatively worse emissions (e.g., more NOx, etc.). The central controller 160 may deactivate a test cell, adjust an aftertreatment component, and/or a combination of the two functions in order to maintain the emissions output at or below a threshold for the facility. Accordingly, the facility may better test each engine 110 with little hesitation regarding the emissions of the engines.

Figures 22, 23, 24:
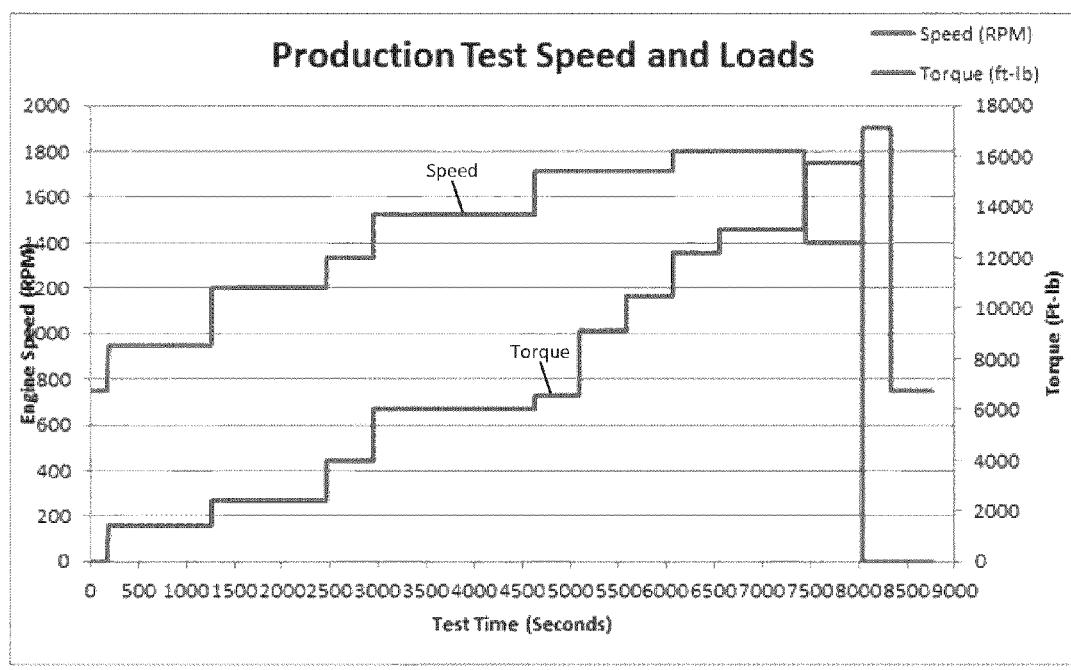
FIG. 22 depicts turbine outlet exhaust gas temperatures for natural gas.
FIG. 23 depicts typical cycle percentage for natural gas engine testing.
FIG. 24 depicts a typical cycle for a production test.

For some engines 110, exemplary conditions when using natural gas are shown in FIGS. 12-24. FIG. 12 depicts $NO_x$ concentrations for natural gas at the inlet of the aftertreatment system 200, which may vary up to plus or minus 15% based on humidity levels. FIG. 13 depicts $NO_x$ concentrations for natural gas blended with $CO_2$ at the inlet of the aftertreatment system 200, which may vary up to plus or minus 15% based on humidity levels. FIG. 14 depicts CO concentrations for natural gas at the inlet of the aftertreatment system 200. FIG. 15 depicts CO concentrations for natural gas blended with $CO_2$ at the inlet of the aftertreatment system 200. FIG. 16 depicts the exhaust flow rates for natural gas. FIG. 17 depicts the exhaust flow rates for natural gas blended with $CO_2$. FIG. 18 depicts the air intake flow rate for natural gas. FIG. 19 depicts the air intake flow rate for natural gas blended with $CO_2$. FIG. 20 depicts a fuel flow rate for natural gas. FIG. 21 depicts a fuel flow rate for natural gas blended with $CO_2$. FIG. 22 depicts turbine outlet exhaust gas temperatures for natural gas. FIG. 23 depicts typical cycle percentage for natural gas engine testing. FIG. 24 depicts a typical cycle for a production test.

Figure 25:
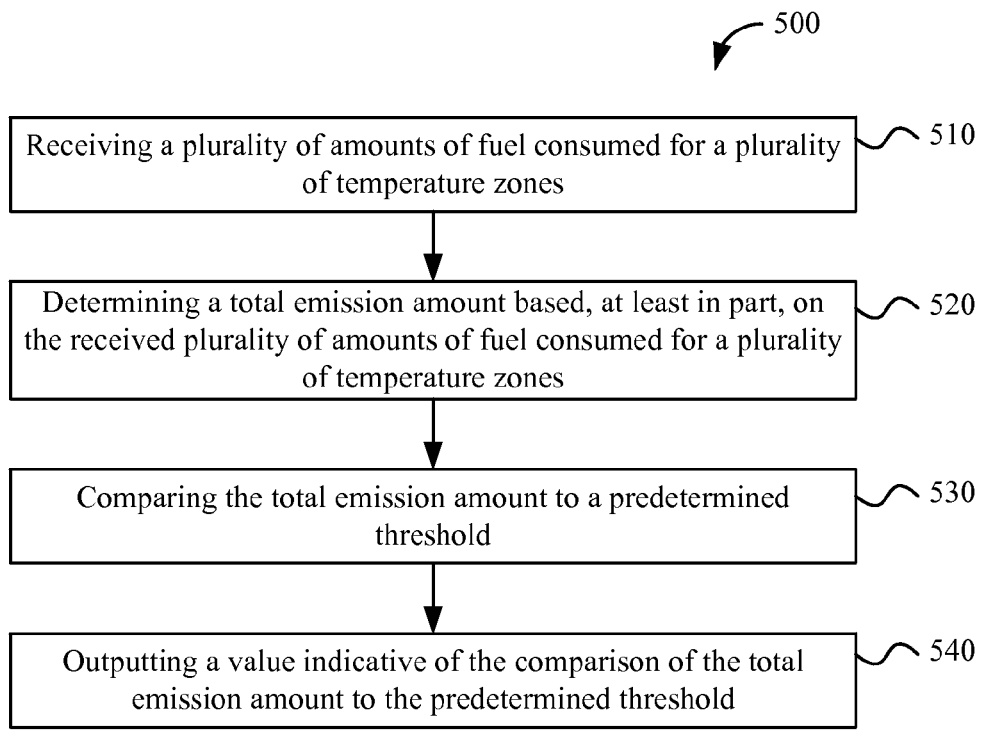
FIG. 25 is a flow diagram of an example process for monitoring a total emission amount of a plurality of engines.

FIG. 25 depicts a flow diagram for an example process 500 for monitoring a total emission amount of a plurality of engines. The process 500 includes receiving a plurality of amounts of fuel consumed for a plurality of temperature zones at 510. The plurality of fuel amounts consumed may be received by a central controller, such as central controller 160 of FIG. 1. The plurality of fuel consumed and the plurality of temperature zones may be received from a system controller, such as system controller 140, for a corresponding engine associated with the system controller. In some instances, the system controller and engine may be for a test cell system, such as test cell system 100. The amount of fuel consumed may be determined by the system controller based on data received from a fuel flow rate sensor, such as fuel flow rate sensor 134. In some implementations, the system controller may receive the data from a fuel flow rate sensor directly and may determine an amount of fuel consumed based on the data from the fuel flow rate sensor. In other implementations, the system controller may receive the amount of fuel consumed from another controller, such as an engine controller 130.

The temperature zones may be determined by the system controller by using data from one or more temperature sensors. In some implementations, the temperature zones may be bucketized or discretized and the system controller may be configured to aggregate the fuel consumption by the engine while an aftertreatment system, such as aftertreatment system 200, is within a corresponding temperature zone. In some implementations, the temperature zones may be determined based on a temperature of one of the temperature sensors, a temperature of a diesel oxidation catalyst, a temperature of a SCR catalyst, a temperature of the exhaust gas at an outlet of the engine, and/or an average of one or more of the foregoing temperatures.

Data for the plurality of amounts of fuel consumed and the plurality of temperature zones may be transmitted from the system controller to the central controller. In some implementations, the plurality of amounts of fuel consumed and the plurality of temperature zones may be transmitted as values in a data table. In other implementations, the plurality of amounts of fuel consumed and the plurality of temperature zones may be transmitted as data pairs. Of course, the data for the plurality of amounts of fuel consumed and the plurality of temperature zones may be in other data structures as well.

A total emission amount may be determined based, at least in part, on the received plurality of amounts of fuel consumed for a plurality of temperature zones at 520. The central controller may determine the total emission amount for an engine, such as engine 110 of a test cell system 100, by using the plurality of amounts of fuel consumed and the plurality of temperature zones to determine an efficiency of the aftertreatment system via a temperature zone efficiency curve or a temperature zone efficiency table. That is, for each temperature zone, the central controller may retrieve an efficiency for the aftertreatment system and, using the total fuel consumed and the efficiency, a value for an emission amount, such as $NO_x$, PM, $SO_x$, and/or CO, may be determined for the fuel consumed at that temperature zone. The values for the emission amounts for the different temperature zones may be aggregated to determine a total emission amount for the engine. In some implementations, the total emission amount for several engines, such as for a facility with several test cell systems, may be aggregated to determine a total emission amount for the facility.

The total emission amount may be compared to a predetermined threshold at block 530. The determined total emission amount, either for each engine or for a facility of several engines, may be compared to a predetermined threshold, such as a 12 month rolling average amount of $NO_x$, PM, $SO_x$, and/or CO. As mentioned above, the predetermined threshold may be in regard to a regulated emissions amount and/or an allowable emissions amount. Further, in some embodiments, the comparison may be in regard to at least one of an adjustment value or range, an alert value or range, and a deactivation value or range, as described above. A value indicative of the comparison of the total emission amount to the predetermined threshold may be outputted at block 540. In some implementations, the value outputted by the central controller may be a binary value, such as a value indicative of whether the total emission value is above or below the predetermined threshold value (e.g., 0 for below the threshold and 1 for above the threshold). Thus, the central controller may monitor the total emissions from an engine and/or a facility relative to a permitted threshold. In other implementations, the value may be a specific reporting value, such as the difference of the total emission amount to the predetermined threshold (e.g., −5.3 lbs. $NO_x$ relative to the predetermined threshold). In still other implementations, the value outputted by the central controller may be a value to be used by another component or process. For example, the outputted value may be a value to trigger an alert to be displayed or activate an alert indicator or light. In other implementations, the value outputted by the central controller may be a value to control one or more components of a test cell system, as will be described in greater detail in reference to FIG. 26.

Figure 26:
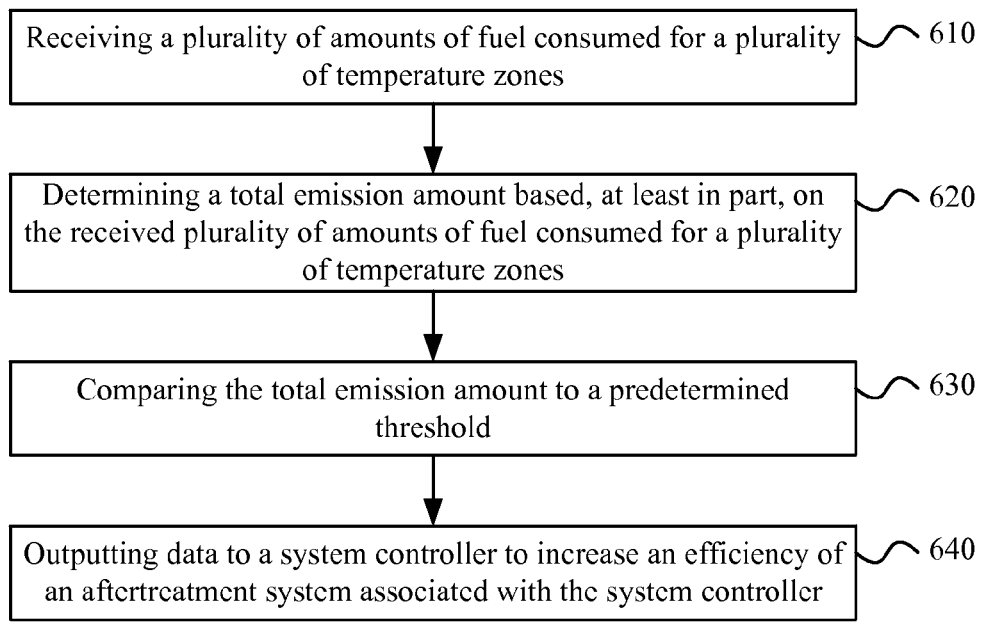
FIG. 26 is a flow diagram of an example process for modifying the efficiency of an aftertreatment system of an engine.

FIG. 26 is a flow diagram of an example process 600 for modifying the efficiency of an aftertreatment system of an engine based on the total emission amount. The process 600 includes receiving a plurality of amounts of fuel consumed for a plurality of temperature zones at 610. The plurality of fuel consumed may be received by a central controller, such as central controller 160 of FIG. 1. The plurality of fuel consumed and the plurality of temperature zones may be received from a system controller, such as system controller 140, for a corresponding engine associated with the system controller. In some instances, the system controller and engine may be for a test cell system, such as test cell system 100. The amount of fuel consumed may be determined by the system controller based on data received from a fuel flow rate sensor, such as fuel flow rate sensor 134. In some implementations, the system controller may receive the data from a fuel flow rate sensor directly and may determine an amount of fuel consumed based on the data from the fuel flow rate sensor. In other implementations, the system controller may receive the amount of fuel consumed from another controller, such as an engine controller 130.

The temperature zones may be determined by the system controller by using data from one or more temperature sensors. In some implementations, the temperature zones may be bucketized or discretized and the system controller may be configured to aggregate the fuel consumption by the engine while an aftertreatment system, such as aftertreatment system 200, is within a corresponding temperature zone. In some implementations, the temperature zones may be determined based on a temperature of one of the temperature sensors, a temperature of a diesel oxidation catalyst, a temperature of a SCR catalyst, a temperature of the exhaust gas at an outlet of the engine, and/or an average of one or more of the foregoing temperatures.

Data for the plurality of amounts of fuel consumed and the plurality of temperature zones may be transmitted from the system controller to the central controller. In some implementations, the plurality of amounts of fuel consumed and the plurality of temperature zones may be transmitted as values in a data table. In other implementations, the plurality of amounts of fuel consumed and the plurality of temperature zones may be transmitted as data pairs. Of course, the data for the plurality of amounts of fuel consumed and the plurality of temperature zones may be in other data structures as well.

A total emission amount may be determined based, at least in part, on the received plurality of amounts of fuel consumed for a plurality of temperature zones at 620. The central controller may determine the total emission amount for an engine, such as engine 110 of a test cell system 100, by using the plurality of amounts of fuel consumed and the plurality of temperature zones to determine an efficiency of the aftertreatment system via a temperature zone efficiency curve or a temperature zone efficiency table. That is, for each temperature zone, the central controller may retrieve an efficiency for the aftertreatment system and, using the total fuel consumed and the efficiency, a value for an emission amount, such as $NO_x$, $SO_x$, PM or CO, may be determined for the fuel consumed at that temperature zone. The values for the emission amounts for the different temperature zones may be aggregated to determine a total emission amount for the engine. In some implementations, the total emission amount for several engines, such as for a facility with several test cell systems, may be aggregated to determine a total emission amount for the facility.

The total emission amount may be compared to a predetermined threshold at block 630. The determined total emission amount, either for each engine or for a facility of several engines, may be compared to a predetermined threshold, such as a 12 month rolling average amount of $NO_x$, $SO_x$, PM or CO. Data may be outputted to a system controller to increase an efficiency of an aftertreatment system associated with the system controller at 640. In some implementations, the data outputted from the central controller to the system controller may include a command to the system controller to modify an operating parameter of a component of the aftertreatment system. For example, the command may cause the system controller to increase or decrease a temperature of the aftertreatment system or a component thereof by activating, deactivating, or modifying the operation of a burner, such as burner 270. In other implementations, the command may cause the system controller to increase or decrease a pressure of the aftertreatment system by activating, deactivating, or modifying the operation of a blower skid, such as blower skid 260. In further implementations, the command may cause the system controller to increase or decrease an amount of reductant introduced in the aftertreatment system by activating, deactivating, or modifying the operation of a reductant delivery system, such as reductant delivery system 220. In still further implementations, a combination of one or more of the foregoing commands may be transmitted to the system controller. In still further implementations, the central controller may output data to control the efficiency of several aftertreatment systems controller by several system controllers. Thus, the central controller may be configured to monitor and control the operation of several engines and associated system controllers to maintain an overall system emission amount below a predetermined threshold, such as a permitted amount for the overall system. In some implementations, the central controller may control engines associated with test cells. In other implementations, the central controller may control engines associated with power generation units.

Figure 27:
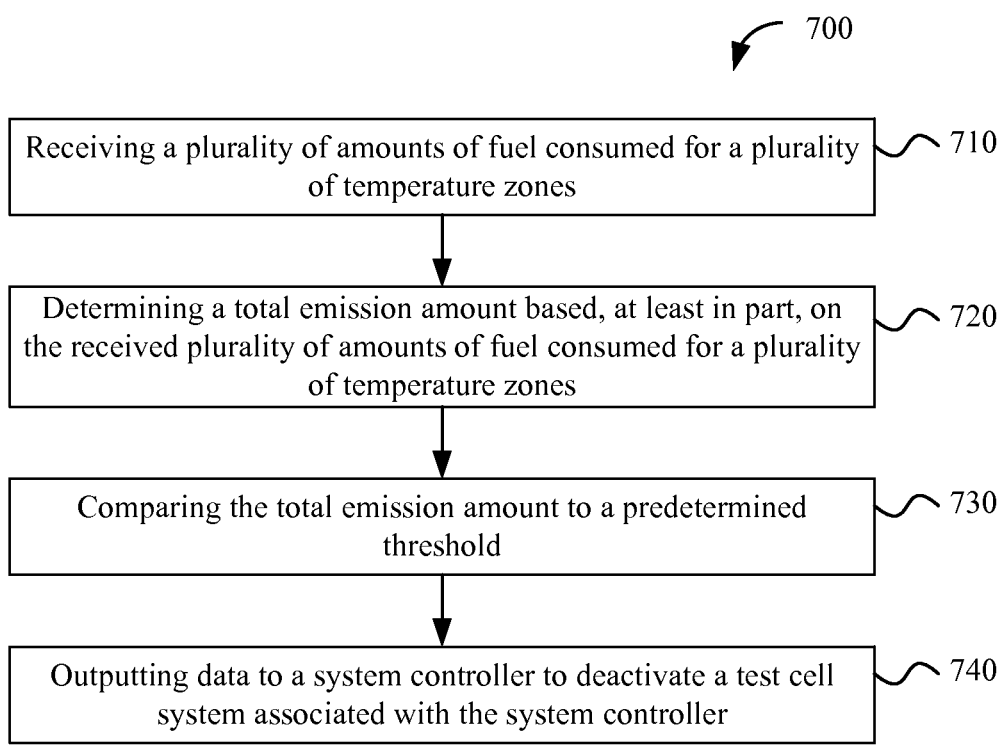
FIG. 27 is a flow diagram of an example process for deactivating a test cell system based on the total emission amount.

FIG. 27 is a flow diagram of an example process 700 for deactivating a test cell system based on the total emission amount. The process 700 includes receiving a plurality of amounts of fuel consumed for a plurality of temperature zones at 710. The plurality of fuel consumed may be received by a central controller, such as central controller 160 of FIG. 1. The plurality of fuel consumed and the plurality of temperature zones may be received from a system controller, such as system controller 140, for a corresponding engine associated with the system controller. In some instances, the system controller and engine may be for a test cell system, such as test cell system 100. The amount of fuel consumed may be determined by the system controller based on data received from a fuel flow rate sensor, such as fuel flow rate sensor 134. In some implementations, the system controller may receive the data from a fuel flow rate sensor directly and may determine an amount of fuel consumed based on the data from the fuel flow rate sensor. In other implementations, the system controller may receive the amount of fuel consumed from another controller, such as an engine controller 130.

The temperature zones may be determined by the system controller by using data from one or more temperature sensors. In some implementations, the temperature zones may be bucketized or discretized and the system controller may be configured to aggregate the fuel consumption by the engine while an aftertreatment system, such as aftertreatment system 200, is within a corresponding temperature zone. In some implementations, the temperature zones may be determined based on a temperature of one of the temperature sensors, a temperature of a diesel oxidation catalyst, a temperature of a SCR catalyst, a temperature of the exhaust gas at an outlet of the engine, and/or an average of one or more of the foregoing temperatures.

Data for the plurality of amounts of fuel consumed and the plurality of temperature zones may be transmitted from the system controller to the central controller. In some implementations, the plurality of amounts of fuel consumed and the plurality of temperature zones may be transmitted as values in a data table. In other implementations, the plurality of amounts of fuel consumed and the plurality of temperature zones may be transmitted as data pairs. Of course, the data for the plurality of amounts of fuel consumed and the plurality of temperature zones may be in other data structures as well.

A total emission amount may be determined based, at least in part, on the received plurality of amounts of fuel consumed for a plurality of temperature zones at 720. The central controller may determine the total emission amount for an engine, such as engine 110 of a test cell system 100, by using the plurality of amounts of fuel consumed and the plurality of temperature zones to determine an efficiency of the aftertreatment system via a temperature zone efficiency curve or a temperature zone efficiency table. That is, for each temperature zone, the central controller may retrieve an efficiency for the aftertreatment system and, using the total fuel consumed and the efficiency, a value for an emission amount, such as $NO_x$, PM, $SO_x$, and/or CO, may be determined for the fuel consumed at that temperature zone. The values for the emission amounts for the different temperature zones may be aggregated to determine a total emission amount for the engine. In some implementations, the total emission amount for several engines, such as for a facility with several test cell systems, may be aggregated to determine a total emission amount for the facility.

The total emission amount may be compared to a predetermined threshold at block 730. The determined total emission amount, either for each engine or for a facility of several engines, may be compared to a predetermined threshold, such as a 12 month rolling average amount of $NO_x$, $SO_x$, PM, or CO. Data may be outputted to a system controller to deactivate a test cell system associated with the system controller at 740. In some implementations, the central controller may output data to the system controller to deactivate an engine associated with the system controller responsive to the comparison of the total emission amount to the predetermined threshold being below a deactivation value. In some instances, several engines may be deactivated if the comparison of the total emission amount (either for a corresponding engine or for several engines) exceeds the predetermined threshold. Thus, if an aftertreatment system of an engine is not operating correctly or the test cell system may exceed its permitted total amount of emissions, the central controller may cause the system controller to perform a controlled shut down of the engine before the test cell system exceeds a permitted amount of emissions. Thus, the process 700 may be utilized to prevent inadvertently exceeding permitted emission amounts.

Implementations of the subject matter and the operations described in this specification can be implemented in digital electronic circuitry, or in machine-readable media embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, as used herein, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    an emissions module structured to interpret data indicative of an emissions amount from a test cell system in a facility;
    an emissions threshold module structured to aggregate the emissions amount from each test cell system in the facility to determine a total emissions amount for the facility and compare the total emissions amount to a predetermined threshold for the facility, wherein the predetermined threshold includes an alert value, an adjustment value, and a deactivation value, the deactivation value being greater than the adjustment value, which is greater than the alert value;
    a temperature module structured to receive temperature data indicative of a plurality of temperature zones of an exhaust gas in an aftertreatment system associated with each test cell system;
    an engine module structured to determine an amount of fuel consumed by an engine in a test cell system at each temperature zone in the plurality of temperature zones; and
    an aftertreatment system control module structured to selectively control a component in the aftertreatment system associated with each test cell system responsive to the comparison of the total emissions amount to the predetermined threshold;
    wherein the emissions module is structured to determine the emissions amount for each temperature zone based at least in part on the amount of fuel consumed during each temperature zone; and
    wherein in response to the total emissions amount being at or greater than the deactivation value, the engine module is structured to deactivate at least one test cell system in the facility;
    wherein in response to the total emissions amount being at or greater than the adjustment value but less than the deactivation value, at least one of the engine module and the aftertreatment system control module adjusts operation of a component in the aftertreatment system and the engine of at least one test cell system to adjust an emissions amount from the at least one test cell system; and
    wherein in response to the total emissions amount being at or greater than the alert value but less than the adjustment value, an alert is provided.

2. The apparatus of claim 1, wherein the component includes at least one of a blower, a burner, and a dosing unit, wherein the aftertreatment system control module is structured to control operation of at least one of the blower, the burner, and the dosing unit to adjust an emissions amount from at least one test cell system in the facility to maintain the total emissions amount for the facility at or below the predetermined threshold.

3. The apparatus of claim 1,
    wherein the engine module is structured to selectively control operation of an engine in a test cell system based on the comparison of the total emissions amount to the predetermined threshold; and
    wherein the aftertreatment system control module and the engine module are structured to cooperatively adjust an emissions amount for the test cell system in the facility by selectively controlling the component in the aftertreatment system and the engine in each test cell system in the facility.

4. The apparatus of claim 3, wherein the engine module and aftertreatment system control module are structured to control each test cell system independently in the facility, such that each test cell system corresponds with a different emissions amount relative to each other test cell system, but the total emissions amount for the facility is at or below the predetermined threshold.

5. The apparatus of claim 1, wherein the predetermined threshold is based on at least one of a federal, state, and local regulation prescribing at least one of an allowable emissions amount and a regulated emissions amount.

6. The apparatus of claim 1, wherein the predetermined threshold is in regard to at least one of a CO amount and a $NO_x$ amount.

7. The apparatus of claim 1, wherein the predetermined threshold is in regard to at least one of a particulate matter (PM) amount and a $SO_x$ amount.

8. The apparatus of claim 1, wherein the predetermined threshold is a 12 month rolling average of at least one of an amount of $NO_x$ and an amount of CO.

9. The apparatus of claim 1, wherein the predetermined threshold is a 12 month rolling average of at least one of an amount of $SO_x$ and an amount of PM.

10. The apparatus of claim 1, wherein the determination of the total emissions amount comprises:
    determining a first amount of NOx for a first amount of fuel consumed at a first temperature zone based on data indicative of a first plurality of amounts of fuel consumed for a first plurality of temperature zones and one of a temperature zone efficiency curve or a temperature zone efficiency table.

11. The apparatus of claim 1, further comprising:
    a communications interface module communicably coupled to an input/output device;
    wherein the communications interface module is structured to output a value indicative of the comparison of the total emissions amount to the predetermined threshold to the input/output device.

12. A system, comprising:
    a test cell system including:
        an engine; and
        an aftertreatment system in exhaust fluid communication with the engine;
    a central controller operatively coupled to the test cell system, the central controller structured to:
        receive data indicative of a first plurality of amounts of fuel consumed for a first plurality of temperature zones of an exhaust gas in the aftertreatment system for the test cell system;

determine a total emissions amount based, at least in part, on the received first plurality of amounts of fuel consumed for the first plurality of temperature zones;

compare the total emissions amount to a predetermined threshold, wherein the predetermined threshold includes an alert value, an adjustment value, and a deactivation value, the deactivation value being greater than the adjustment value, which is greater than the alert value;

in response to the total emissions amount being at or greater than the deactivation value, deactivate the test cell system;

in response to the total emissions amount being at or greater than the adjustment value but less than the deactivation value, adjust operation of at least one component in the aftertreatment system and the engine to adjust an emissions amount from the test cell system; and in response to the total emissions amount being at or greater than the alert value but less than the adjustment value, provide an alert.

13. The system of claim 12, wherein the total emissions amount is in regard to at least one of an amount of $NO_x$ and an amount of CO.

14. The system of claim 12, wherein the central controller is further structured to increase an efficiency of the aftertreatment system associated with the test cell system based on the total emissions amount being within the adjustment value.

15. The system of claim 12, further comprising:

an air flow rate sensor for an intake of the engine, wherein the air flow rate sensor is structured to measure an air flow rate for the intake of the engine;

a natural gas flow rate sensor associated with a burner in the aftertreatment system, wherein the natural gas flow rate sensor is structured to measure a natural gas flow rate for the burner;

a temperature sensor of the aftertreatment system, wherein the temperature sensor is structured to measure a temperature in the aftertreatment system;

a $NO_x$ sensor of the aftertreatment system, wherein the $NO_x$ sensor is structured to measure a $NO_x$ flow rate in the aftertreatment system;

a DEF supply sensor associated with a dosing unit of the aftertreatment system, wherein the DEF supply sensor is structured to measure a DEF flow rate from a doser in the dosing unit; and a system controller associated with the test cell system and communicably coupled to the central controller, wherein the system controller is structured to receive the air flow rate, the natural gas flow rate, the temperature, the $NO_x$ flow rate, and the DEF flow rate data to provide to the central controller;

wherein the central controller is structured to receive the air flow rate, the natural gas flow rate, the temperature, the $NO_x$ flow rate, and the DEF flow rate data from the system controller and control at least one of the doser, the burner, the engine, and a blower in the test cell system to maintain a total emissions amount for the facility at or below the predetermined threshold.

16. A method, comprising:

receiving, by a controller, data indicative of a plurality of amounts of fuel consumed for a plurality of temperature zones of an exhaust gas in an aftertreatment system associated with an engine for a plurality of engine and exhaust aftertreatment systems;

determining, by the controller, a total emissions amount based, at least in part, on the received plurality of amounts of fuel consumed for each engine in the plurality of engine and exhaust aftertreatment systems;

comparing, by the controller, the total emissions amount to a predetermined threshold, wherein the predetermined threshold includes an alert value, an adjustment value, and a deactivation value, the deactivation value being greater than the adjustment value, which is greater than the alert value;

deactivating, by the controller, at least one engine and exhaust aftertreatment system in a facility housing the plurality of engine and exhaust aftertreatment systems in response to the total emissions amount being at or greater than the deactivation value;

adjusting, by the controller, operation of at least one component in at least one engine and exhaust aftertreatment system in the facility in response to the total emissions amount being at or greater than the adjustment value but less than the deactivation value; and providing, by the controller, an alert in response to the total emissions amount being at or greater than the alert value but less than the adjustment value.

17. The method of claim 16, wherein adjusting operation of the at least component includes the controller providing a command that includes at least one of increasing or decreasing a temperature of a component of the aftertreatment system by activating, deactivating, or modifying an operation of a burner; at least one of increasing or decreasing a pressure in the aftertreatment system by activating, deactivating, or modifying operation of a blower; and, at least one of increasing or decreasing an amount of reductant introduced in the aftertreatment system by activating, deactivating, or modifying operation of a reductant delivery system in the aftertreatment system.

18. The method of claim 16, wherein the predetermined threshold is in regard to at least one of an amount of $NO_x$ and an amount of CO.

19. The method of claim 16, wherein the predetermined threshold is in regard to at least one of an amount of $SO_x$ and an amount of PM.

* * * * *